US011343045B2

(12) United States Patent
Xu et al.

(10) Patent No.: US 11,343,045 B2
(45) Date of Patent: May 24, 2022

(54) INFORMATION TRANSMISSION METHOD AND APPARATUS

(71) Applicant: Huawei Technologies Co., Ltd., Shenzhen (CN)

(72) Inventors: Minghui Xu, Chengdu (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 16/788,237

(22) Filed: Feb. 11, 2020

(65) Prior Publication Data
US 2020/0186311 A1    Jun. 11, 2020

Related U.S. Application Data

(63) Continuation of application No. PCT/CN2018/096433, filed on Jul. 20, 2018.

(30) Foreign Application Priority Data

Aug. 11, 2017 (CN) .......................... 201710687912.4

(51) Int. Cl.
H04L 5/00 (2006.01)
H04W 72/00 (2009.01)
H04W 72/04 (2009.01)

(52) U.S. Cl.
CPC ......... *H04L 5/0051* (2013.01); *H04W 72/005* (2013.01); *H04W 72/044* (2013.01); *H04B 2201/71636* (2013.01)

(58) Field of Classification Search
CPC ..... H04L 5/003; H04L 5/0048; H04L 5/0051; H04L 7/04; H04W 72/00; H04W 72/005;
(Continued)

(56) References Cited

U.S. PATENT DOCUMENTS

2004/0090353 A1    5/2004 Moore
2013/0266086 A1   10/2013 Yang et al.
(Continued)

FOREIGN PATENT DOCUMENTS

CN    101350801 A    1/2009
CN    105122871 A   12/2015
(Continued)

OTHER PUBLICATIONS

"On DL PTRS design," 3GPP TSG-RAN WG1 #89, Hangzhou, China, R1-1708707, pp. 1-9, XP051262604, 3rd Generation Partnership Project, Valbonne, France (May 15-19, 2017).
(Continued)

*Primary Examiner* — Warner Wong
(74) *Attorney, Agent, or Firm* — Leydig, Voit & Mayer, Ltd.

(57) ABSTRACT

An information transmission method and apparatus are provided. The method includes: determining a time domain density of a phase tracking reference signal (PTRS); determining a frequency domain density of the PTRS based on an available bandwidth, a scheduled resource block (RB) or an available RB; mapping the PTRS to one or more orthogonal frequency division multiplexing (OFDM) symbols based on the time domain density and the frequency domain density; and sending a signal that includes the OFDM symbol to which the PTRS is mapped. According to this application, a quantity of PTRSs can be prevented from jumping when a value of scheduled bandwidth is close to a threshold, both accuracy of common phase error estimation and spectral efficiency are taken into consideration, and the PTRSs can be uniformly mapped in the scheduled or available bandwidth, thereby properly configuring the PTRSs.

18 Claims, 13 Drawing Sheets

(58) Field of Classification Search
CPC ............. H04W 72/04; H04W 72/0413; H04W 72/042; H04W 72/044; H04W 72/0453; H04W 56/0035; H04J 11/0079; H04B 1/7075; H04B 12/12; H04B 7/2693; H04B 2201/71636

See application file for complete search history.

(56) References Cited

U.S. PATENT DOCUMENTS

| | | | |
|---|---|---|---|
| 2014/0016622 | A1 | 1/2014 | Bao et al. |
| 2014/0192729 | A1 | 7/2014 | Kim et al. |
| 2014/0314000 | A1 | 10/2014 | Liu et al. |
| 2017/0294926 | A1* | 10/2017 | Islam ............... H04W 72/042 |
| 2018/0041321 | A1* | 2/2018 | Guo ................ H04L 5/0048 |
| 2018/0234278 | A1 | 8/2018 | Xu et al. |
| 2018/0359069 | A1* | 12/2018 | Nam ............... H04L 5/0048 |
| 2018/0367274 | A1 | 12/2018 | Shi et al. |
| 2019/0245728 | A1* | 8/2019 | Li ................ H04L 1/0009 |
| 2019/0296877 | A1* | 9/2019 | Zhang ............ H04W 72/042 |
| 2019/0349240 | A1* | 11/2019 | Saito ............. H04L 5/0048 |
| 2019/0356540 | A1* | 11/2019 | Sun .............. H04L 5/0091 |
| 2020/0014563 | A1* | 1/2020 | Wang ............ H04L 5/0048 |
| 2020/0163078 | A1* | 5/2020 | Jiang ............... H04J 13/18 |
| 2020/0213050 | A1* | 7/2020 | Chen ............. H04L 5/0048 |
| 2020/0304259 | A1* | 9/2020 | Ihalainen ........... H04B 7/0413 |
| 2020/0344023 | A1* | 10/2020 | Kundargi .......... H04W 56/0035 |

FOREIGN PATENT DOCUMENTS

| | | |
|---|---|---|
| CN | 105827383 A | 8/2016 |
| CN | 106559162 A | 4/2017 |
| WO | 2017133306 A1 | 8/2017 |

OTHER PUBLICATIONS

"Phase-Tracking Reference Signal Design for High-Frequency Systems," 3GPP TSG RAN WG1 Meeting #88, Athens, Greece, R1-1703406, pp. 1-11, XP051210534, 3rd Generation Partnership Project, Valbonne, France (Feb. 13-17, 2017).

"PTRS for CP-OFDM," 3GPP TSG RAN WG1 Ad Hoc Meeting, Qingdao, China, R1-1709939, Total 6 pages, XP051304679, 3rd Generation Partnership Project, Valbonne, France (Jun. 27-30, 2017).

"Discussion on PT-RS design for CP-OFDM," 3GPP TSG RAN WG1 NR Ad-Hoc#2, R1-1711308, Total 10 pages, XP051304618, 3rd Generation Partnership Project, Valbonne, France (Jun. 27-30, 2017).

"Discussion on explicit and implicit signaling for PT-RS," 3GPP TSG RAN WG1 Meeting #89, Hangzhou, China, R1-1708272, pp. 1-11, XP051273465, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Physical channels and modulation (Release 14)," 3GPP TS 36.211 V14.3.0, pp. 1-195, 3rd Generation Partnership Project, Valbonne, France (Jun. 2017).

"On PT-RS design for CP-OFDM," 3GPP TSG RAN WG1 Ad-Hoc#2, Qingdao, P.R. China, R1-1710403, pp. 1-4, 3rd Generation Partnership Project, Valbonne, France (Jun. 27-30, 2017).

CN/201710687912.4, Notice of Allowance/Search Report, dated Jul. 26, 2021.

* cited by examiner

| RBs | RB 0 | RB 1 | RB 2 | RB 3 | RB 4 | RB 5 | RB 6 | RB 7 | RB 8 | RB 9 | RB 10 | RB 11 | RB 12 | RB 13 | RB 14 |
|---|---|---|---|---|---|---|---|---|---|---|---|---|---|---|---|
| | | | | | | Downlink bandwidth = 3 MHz | | | | | | | | | |

| RBGs | RBG 0 | RBG 1 | RBG 2 | RBG 3 | RBG 4 | RBG 5 | RBG 6 | RBG 7 |
|---|---|---|---|---|---|---|---|---|

| Bitmap IN DCI | 0 | 0 | 0 | 0 | 1 | 0 | 1 | 1 |
|---|---|---|---|---|---|---|---|---|

MSB ←——————————————→ LSB

▨ RB to which a PTRS is mapped

INFORMATION TRANSMISSION METHOD AND APPARATUS

CROSS-REFERENCE TO RELATED APPLICATIONS

This application is a continuation of International Application No. PCT/CN2018/096433, filed on Jul. 20, 2018, which claims priority to Chinese Patent Application No. 201710687912.4, filed on Aug. 11, 2017. The disclosures of the aforementioned applications are hereby incorporated by reference in their entireties.

TECHNICAL FIELD

Embodiments of this application relate to the field of communications technologies, and in particular, to signal transmission in a wireless communications system.

BACKGROUND

With increasing communication requirements, a next generation wireless communications network (for example, 5th generation mobile communication (5th generation, 5G)) with an operating frequency band of at least 6 GHz can provide an ultrafast data communication service. In a frequency range of at least 6 GHz, frequency bands available for the next generation wireless communications network include frequency bands of 28 GHz, 39 GHz, 60 GHz, 73 GHz, and the like. A high frequency communications system of at least 6 GHz has significant characteristics such as large bandwidth and a highly integrated antenna array, thereby easily achieving a relatively high throughput. In addition, compared with an existing wireless communications network, the high frequency communications system is subject to severer intermediate radio frequency distortion, especially impact caused by phase noise (PHN) or a phase offset. In addition, a Doppler effect and a carrier frequency offset (CFO) have greater impact on performance of the high frequency communications system as a location of a frequency band becomes higher. A common characteristic of the phase noise, the Doppler effect, and the CFO is that a phase error or a phase offset is caused when the high frequency communications system receives data, consequently the high frequency communications system is degraded in performance or even cannot work.

It is proposed that in the next generation wireless communications system, a phase tracking reference signal (PTRS) or a phase compensation reference signal is used to estimate a common phase error (CPE). Because phase offsets or rotations on all carriers of a same multicarrier symbol are the same, the accuracy of CPE estimation depends on a quantity of PTRSs in frequency domain. How to design a PTRS is an urgent problem to be resolved.

An existing technology is to set an association relationship between a frequency domain density of a PTRS and scheduled bandwidth. For example, the association relationship between the frequency domain density of the PTRS and the scheduled bandwidth is set as shown in Table 1.

TABLE 1

| Scheduled bandwidth | Frequency domain density of a PTRS |
| --- | --- |
| $0 \leq N_{RB} < N_{RB1}$ | Skipping setting a PTRS |
| $N_{RB1} \leq N_{RB} < N_{RB2}$ | $FD_1$ |
| $N_{RB2} \leq N_{RB} < N_{RB3}$ | $FD_2$ |
| $N_{RB3} \leq N_{RB} < N_{RB4}$ | $FD_3$ |
| $N_{RB4} \leq N_{RB} < N_{RB5}$ | $FD_4$ |
| $N_{RB5} \leq N_{RB}$ | $FD_5$ |

$N_{RB}$ represents a current scheduled bandwidth whose unit is a resource block (RB); $N_{RBi}$ represents bandwidth thresholds corresponding to different frequency domain densities; $FD_1, FD_2, \ldots,$ and $FD_5$ are frequency domain densities; if $FD_1=1$, it indicates that each resource block is mapped to one PTRS; and by analogy, if $FD_2=1/2$, it indicates that every two resource blocks are mapped to one PTRS. A transmit end and a receive end each can determine a current frequency domain density of a PTRS based on scheduled bandwidth.

According to the association relationship in Table 1, larger scheduled bandwidth indicates a smaller frequency domain density of the PTRS, to be specific, $FD_1 > FD_2 > \ldots > FD_5$. However, when a value of the scheduled bandwidth is equal to a threshold or is close to a threshold, a quantity of PTRSs jumps. For example, if $4 \leq N_{RB} < 8$, one PTRS is set for each RB, if $8 \leq N_{RB} < 32$, one PTRS is set for every two RBs, and if $N_{RB} \geq 32$, one PTRS is set for every four RBs. Therefore, scheduled bandwidth of 6 RBs corresponds to 6 PTRSs, scheduled bandwidth of 8 RBs corresponds to 4 PTRSs, scheduled bandwidth of 30 RBs corresponds to 15 PTRSs, and scheduled bandwidth of 32 RBs corresponds to 8 PTRSs. In other words, when the value of the scheduled bandwidth is close to the threshold, an increase in the scheduled bandwidth leads to a decrease in the quantity of PTRSs, so that the accuracy of the CPE estimation cannot be ensured. Because of the jump, a decrease in the scheduled bandwidth leads to an increase in the quantity of PTRSs, so that spectral efficiency is reduced.

Another existing technology is to set an association relationship between a quantity of PTRSs in frequency domain and scheduled bandwidth. For example, the association relationship between the quantity of PTRSs in frequency domain and the scheduled bandwidth is set as shown in Table 2.

TABLE 2

| Scheduled bandwidth | Frequency domain density of a PTRS |
| --- | --- |
| $0 \leq N_{RB} < N_{RB1}$ | 1 or $L_1/N_{RB}$ |
| $N_{RB1} \leq N_{RB} < N_{RB2}$ | $L_2/N_{RB}$ |
| $N_{RB2} \leq N_{RB} < N_{RB3}$ | $L_3/N_{RB}$ |
| ... | ... |
| $N_{RB5} \leq N_{RB}$ | $L_N/N_{RB}$ |

According to the solution in Table 2, when the quantity of PTRSs in frequency domain corresponding to each interval is fixed, it can be ensured that the quantity of PTRSs remains unchanged or is increased as the scheduled bandwidth is increased.

However, this solution also brings about a problem of nonuniform PTRS mapping because when the quantity of PTRSs is fixed, $L_N/N_{RB}$ may not be an integer. In the prior art, Formula (1) is used to determine a number i of an RB in which a PTRS is mapped to an OFDM symbol.

$$i = \left\lfloor l \frac{P}{L} \right\rfloor + k, l = 0, 1, \ldots, L-1 \qquad \text{Formula (1)}$$

P represents a quantity of scheduled RBs, that is, $N_{RB}$; L represents a quantity of PTRSs; and k is an offset value that may be set to 0 or 1. FIG. 1 is a schematic diagram of mapping a fixed quantity of PTRSs to a plurality of types of scheduled bandwidth. If 8 PTRSs are mapped to RBs whose quantities are 9 to 16 and k=0, the RBs to which the PTRSs are mapped are shown in FIG. 1. It can be learned that the RBs to which the PTRSs are mapped are nonuniform. In other words, spacings between adjacent RBs to which the PTRSs are mapped are different. Because the PTRS mapping is nonuniform, it may become more difficult to deal with a collision between a PTRS and another reference signal (reference signal, RS) or channel.

SUMMARY

This application provides an information transmission method and apparatus, to configure a PTRS properly.

According to an aspect of this application, an information transmission solution is provided, including: determining, by a transmit end device, a time domain density of a phase tracking reference signal PTRS; determining a frequency domain density of the PTRS; mapping the PTRS to an orthogonal frequency division multiplexing OFDM symbol based on the time domain density, the frequency domain density, and/or a frequency domain offset; and sending a signal that includes the OFDM symbol to which the PTRS is mapped.

In a design, the frequency domain density of the PTRS may be determined based on available bandwidth, and then the PTRS is mapped. Because the PTRS is mapped based on the available bandwidth instead of scheduled bandwidth, no PTRS is mapped to collided bandwidth, thereby effectively avoiding a collision between the PTRS and another signal.

In another design, the frequency domain density of the PTRS may be determined based on index information of a scheduled resource block RB or an available resource block RB or a quantity of scheduled or available RBs. In this design, a quantity of PTRSs can be prevented from jumping when a value of scheduled bandwidth is close to a threshold, both accuracy of common phase error estimation and spectral efficiency are taken into consideration, and the PTRSs can be uniformly mapped in the scheduled or available bandwidth, thereby properly configuring the PTRSs.

The method further includes: receiving, by a receive end device, one or more orthogonal frequency division multiplexing OFDM symbols; and determining the phase tracking reference signal PTRS mapped to the one or more OFDM symbols. The determining the PTRS includes: determining the time domain density of the phase tracking reference signal PTRS; and determining the frequency domain density of the phase tracking reference signal PTRS based on the available bandwidth, or determining the frequency domain density of the phase tracking reference signal PTRS based on the scheduled or available resource block RB. The receive end device can accurately and efficiently obtain a received signal on the PTRS based on the time domain density and the frequency domain density of the PTRS, thereby improving the efficiency of receiving the PTRS signal.

In a possible implementation, the determining a time domain density of a PTRS includes: determining the time domain density of the PTRS based on a modulation and coding scheme MCS. In this implementation, when the time domain density of the PTRS is determined, symbols to which PTRSs are mapped are determined.

In another possible implementation, the determining the frequency domain density of the PTRS based on index information of a scheduled RB or an available RB or a quantity of scheduled or available RBs includes: dividing the scheduled or available RB into at least one RB index interval, where each RB index interval corresponds to a frequency domain density of the PTRS. In this implementation, the scheduled or available RB is divided into one or more RB index intervals, and RB index intervals may correspond to different frequency domain densities of the PTRS, so that PTRSs can be distributed uniformly in frequency domain.

In still another possible implementation, each RB index interval corresponds to one frequency domain offset, and the frequency domain offset is a remainder between a set offset and the frequency domain density of the PTRS corresponding to each RB index interval. In this implementation, a frequency domain offset is obtained by using a REM operation, and the PTRS is mapped based on the frequency domain offset in each RB index interval, so that the PTRSs can be distributed uniformly in frequency domain.

In yet another possible implementation, each RB index interval corresponds to one frequency domain offset, and the frequency domain offset corresponding to each RB index interval is a preset value, or at least one frequency domain offset and the at least one RB index interval constitute a correspondence list.

In still yet another possible implementation, the index information of the scheduled or available RB is a serial number obtained after numbers of scheduled virtual RBs are sorted, or the index information of the scheduled or available RB is a serial number obtained after numbers of the scheduled physical RBs are sorted. In this implementation, an index of the RB is a relative RB number, so that the index of the scheduled or available RB is a number in order.

According to another aspect of this application, an information transmission solution is provided, including: uniformly configuring, by a transmit end device, phase tracking reference signals PTRSs, and mapping the PTRSs to an OFDM symbol; and receiving, by a receive end device, an orthogonal frequency division multiplexing OFDM symbol to which the PTRSs are mapped, and obtaining a received signal on the PTRS, where the PTRS is mapped to the OFDM symbol based on a time domain density, a frequency domain density, and/or a frequency domain offset, and the frequency domain density is determined based on index information of a scheduled or available resource block RB or a quantity of scheduled or available RBs. In this implementation, because the transmit end device uniformly configures the PTRS, the receive end device can accurately and efficiently obtain a received signal on the PTRS, thereby improving the efficiency of receiving the PTRS signal.

In a possible implementation, after the obtaining a received signal on the PTRS, the method further includes: estimating a common phase error based on the received signal on the PTRS. In this implementation, the transmit end device properly configures the PTRS, so that the received signal on the PTRS can be used to accurately estimate the common phase error.

In a possible design, the available bandwidth is a part other than (not including) preoccupied bandwidth in the scheduled bandwidth, or the available bandwidth is a part other than (not including) reserved bandwidth in the scheduled bandwidth, or the available bandwidth is a part other than (not including) preoccupied bandwidth and reserved bandwidth in the scheduled bandwidth.

In a possible design, available bandwidth can be respectively calculated on those symbols to which the PTRSs are mapped. For example, if the time domain density of the PTRS is 1/2, a possible result is that the PTRSs are respectively mapped to symbols 1, 3, 5, 7, and . . . , and the available bandwidth of the symbols 1, 3, 5, 7, and . . . is respectively calculated.

In another possible design, the downlink signal includes one or more of the following: a synchronization block SS block, a physical downlink control channel PDCCH, an enhanced physical downlink control channel EPDCCH, a physical broadcast channel PBCH, a primary synchronization signal PSS, a secondary synchronization signal SSS, a demodulation reference signal DMRS, or a channel state information-reference signal CSI-RS.

In another possible design, the uplink signal is one or more of the following: a physical uplink control channel PUCCH, a demodulation reference signal DMRS, and a sounding reference signal SRS.

Optionally, a table is preconfigured or prestored, and the table records information about a mapping relationship between available bandwidth and a frequency domain density or a quantity of PTRSs in frequency domain.

In a possible design, the transmit end device and/or the receive end device may store a correspondence list.

The list includes at least one RB index interval and at least one frequency domain density of the PTRS, and the RB index interval and the frequency domain density of the PTRS are in a one-to-one correspondence; or the list includes at least one RB quantity interval and at least one frequency domain density of the PTRS, and the RB quantity interval and the frequency domain density of the PTRS are in a one-to-one correspondence; or the list includes at least one RB index interval, at least one frequency domain density of the PTRS, and at least one frequency domain offset, and the RB index interval, the frequency domain density of the PTRS, and the frequency domain offset are in a one-to-one correspondence; or the list includes at least one RB quantity interval, at least one frequency domain density of the PTRS, and at least one frequency domain offset, and the RB quantity interval, the frequency domain density of the PTRS, and the frequency domain offset are in a one-to-one correspondence.

In another possible design, when the available bandwidth is lower than a preset threshold, the frequency domain density of the PTRS is 0 or the quantity of the PTRSs in frequency domain is 0.

When the available bandwidth is lower than a preset threshold, the PTRS does not need to be mapped because when the available bandwidth is lower than a preset threshold, if the PTRS is mapped, spectral efficiency decreases. Therefore, skipping mapping the PTRS is a better option.

The transmit end device (network device) may send one or more of the following to the terminal device: information used to indicate current MCS index information, information used to indicate scheduled bandwidth, information used to indicate preoccupied bandwidth, and information used to indicate reserved bandwidth.

According to still another aspect of this application, a communication solution is provided, including: determining, by a transmit end device, a time domain density of a phase tracking reference signal PTRS; determining a quantity L of PTRSs mapped in frequency domain; determining a frequency domain RB number i of L PTRSs on $N_{RB}$ resource blocks RBs according to the following formula:

$$i = 1 \left\lfloor \frac{N_{RB}}{L} \right\rfloor + k_1, 1 = 0, 1, \ldots, L-1;$$

$$k_1 = 0, 1, \ldots, N_{RB} - L^* \left\lfloor \frac{N_{RB}}{L} \right\rfloor,$$

where $k_1$ is an offset, and $k_1$ is an integer; mapping the PTRS to an OFDM symbol based on the time domain density and the frequency domain RB number of the PTRS; and sending the OFDM symbol to which the PTRS is mapped; and receiving, by a receive end device, an orthogonal frequency division multiplexing OFDM symbol to which the phase tracking reference signal PTRS is mapped, and obtaining a received signal on the PTRS. According to the PTRS configuration in this communication solution, both accuracy of common phase error estimation and spectral efficiency are taken into consideration, and the PTRSs can be uniformly mapped in the scheduled or available bandwidth, thereby properly configuring the PTRSs. The receive end device can accurately and efficiently obtain a received signal on the PTRS, thereby improving the efficiency of receiving the PTRS signal.

In a possible implementation, the RB number is a serial number obtained after numbers of scheduled virtual RBs are sorted, or the RB number is a serial number obtained after numbers of the scheduled physical RBs are sorted. In this implementation, an index of the RB is a relative RB number, so that the index of the scheduled or available RB is a number in order.

In another possible implementation, frequency domain resource element RE number $Index_{RE}$ of L PTRSs on $N_{RB}$ resource blocks can be determined according to the following formula:

$$Index_{RE} = 1^* \left\lfloor \frac{N_{RB}{}^*12}{L^* I_{DMRS}} \right\rfloor {}^* I_{DMRS} + k_2 {}^* I_{DMRS}, 1 = 0, 1, \ldots, L-1,$$

where $I_{DMRS}$ is a frequency domain spacing of a demodulation reference signal DMRS; and $k_2$ is an offset of the RE, and $$k_2 = 0, 1, \ldots, \frac{N_{RB}{}^*12}{I_{DMRS}} - L^* \left\lfloor \frac{N_{RB}{}^*12}{L^* I_{DMRS}} \right\rfloor.$$

In this implementation, the PTRS is mapped at an RE level, and a mapping location of the PTRS is related to a DMRS location of a DMRS port associated with the PTRS.

According to yet another aspect of this application, a communications apparatus is further provided. The communications apparatus may be used as a transmit end device or a receive end device to implement any one of the foregoing communication solutions. For example, the communications apparatus may be a chip (for example, a baseband chip, or a communications chip) or a device (for example, a network device, a base station, a baseband processing board, or a terminal device). The foregoing methods can be implemented by software, by hardware, or by hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (instruction) and/or data required by the apparatus. Optionally, the communications apparatus may further include a communications interface configured to support communication between the apparatus and another network element.

In another possible implementation, the communications apparatus may include a processing unit and a transceiver unit. The transceiver unit is configured to implement a sending/receiving function, and the processing unit is configured to implement the foregoing processing functions. For example, the processing unit is configured to determine a time domain density of a phase tracking reference signal PTRS. The processing unit is further configured to determine a frequency domain density of a PTRS. The communications apparatus may further include a storage unit, and the storage unit is configured to implement the foregoing saving/storage function, for example, storing a correspondence list or another required program (instruction) and data. The processing unit can be implemented by using one or more processors, and the storage unit can be implemented by using one or more processors. The transceiver unit may be a transceiver circuit (an input/output circuit), a communications interface, or a transceiver.

For example, when the communications apparatus is a chip, the transceiver unit may be an input/output circuit or a communications interface. When the communications apparatus is a base station or a terminal, the transceiver unit may be a transceiver (may also be referred to as a transceiver).

In a possible implementation, the processing unit may be configured to determine a time domain density of a PTRS based on a modulation and coding scheme MCS.

In a possible implementation, the processing unit may be configured to divide a scheduled RB or an available RB into at least one RB index interval, and each RB index interval corresponds to a frequency domain density of the PTRS.

In a possible implementation, each RB index interval corresponds to one frequency domain offset, and the frequency domain offset is a remainder between a set offset and the frequency domain density of the PTRS corresponding to each RB index interval.

In a possible implementation, each RB index interval corresponds to one frequency domain offset, and the frequency domain offset corresponding to each RB index interval is a preset value, or at least one frequency domain offset and the at least one RB index interval constitute a correspondence list.

In a possible implementation, the index information of the scheduled or available RB is a serial number obtained after numbers of scheduled virtual RBs are sorted, or the index information of the scheduled or available RB is a serial number obtained after numbers of the scheduled physical RBs are sorted.

In a possible implementation, the processing unit is further configured to estimate a common phase error based on the received signal on the PTRS.

In a possible implementation, the processing unit is configured to determine a quantity L of the PTRSs mapped in frequency domain.

In a possible implementation, the processing unit is configured to determine a frequency domain resource element RE number $Index_{RE}$ of L PTRSs.

According to still yet another aspect of this application, a wireless communications system is provided, including the transmit end device and the receive end device.

According to a further aspect of this application, a computer readable storage medium is provided. The computer readable storage medium stores an instruction. When the instruction is run on a computer, the computer performs the method in the foregoing aspects.

According to a still further aspect of this application, a computer program product including an instruction is provided. When the instruction is run on a computer, the computer performs the methods in the foregoing aspects.

BRIEF DESCRIPTION OF DRAWINGS

To describe the technical solutions in the embodiments of the present invention or in the background more clearly, the following describes the accompanying drawings required for describing the embodiments of the present invention or the background.

FIG. 10 is a schematic diagram of resource allocation according to an embodiment of the present invention;

DESCRIPTION OF EMBODIMENTS

The following describes embodiments of the present invention with reference to accompanying drawings in the embodiments of the present invention.

Figure 1:
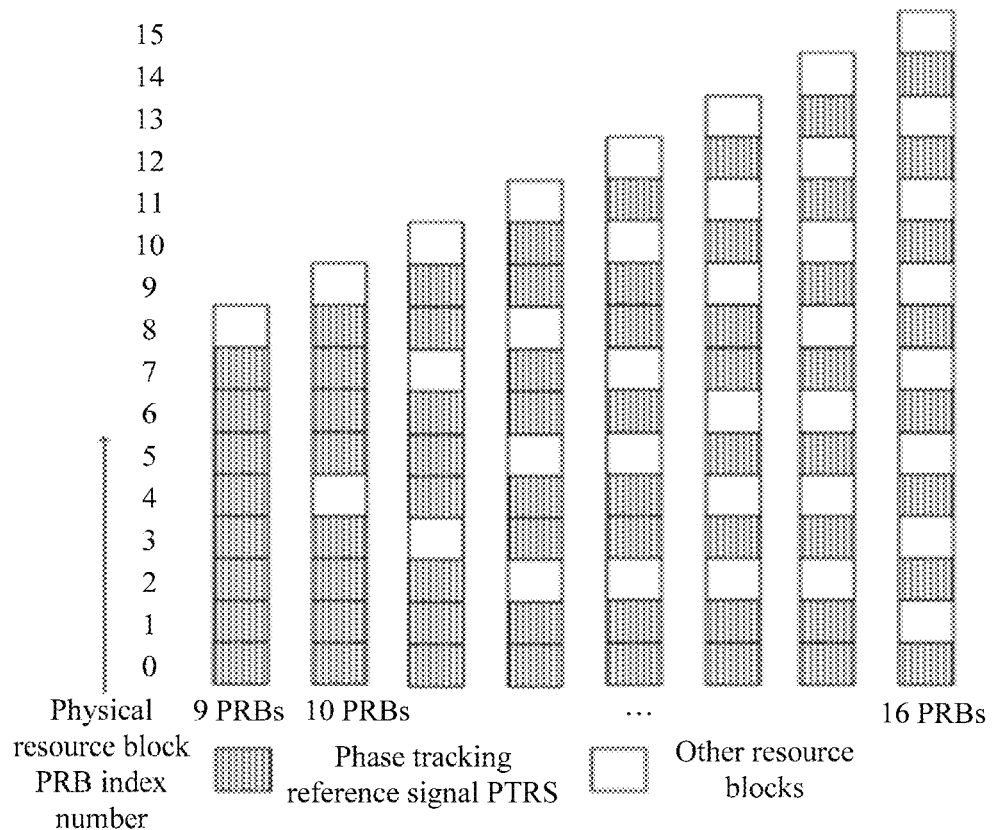
FIG. 1 is a schematic diagram of mapping a fixed quantity of PTRSs to a plurality of types of scheduled bandwidth in the prior art.
Figure 2:
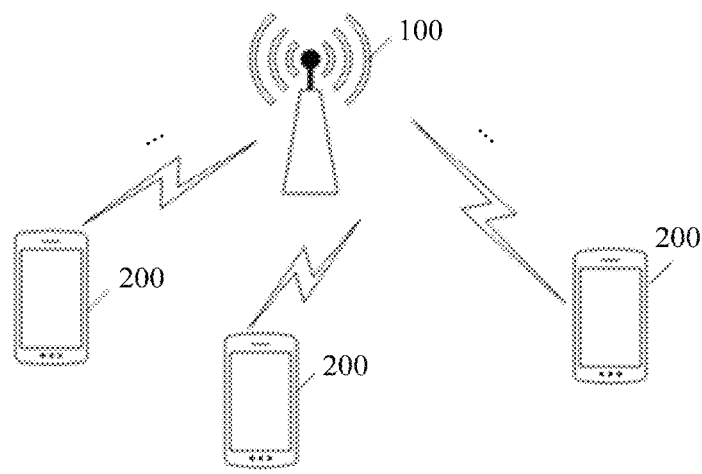
FIG. 2 is a schematic diagram of a communications system according to an embodiment of the present invention.

FIG. 2 is a schematic diagram of a communications system. The system can be widely used to provide various types of communication, such as voice and data. The communications system may include a plurality of wireless communications devices, for example, may include at least one terminal device 200 that communicates with a radio access network. The radio access network is connected to a core network. The radio access network includes at least one network device 100 (only one is shown in FIG. 1) that communicates with the terminal device 200. The network device 100 may be any kind of device having a wireless transceiver function, and includes but is not limited to a base station (for example, a NodeB, an evolved NodeB, a base station in a 5th generation (the fifth generation, 5G) communications system, a base station or a network device in a future communications system, or an access node, a wireless relay node, or a wireless backhaul node in a WiFi system). The network device 100 may alternatively be a radio controller in a cloud radio access network (CRAN) scenario. The network device 100 may alternatively be a network device in the 5G network or a network device in a future evolved network, and may alternatively be a wearable device, an in-vehicle device, or the like. The network device 100 may alternatively be a small cell, a transmission node (transmission reference point, TRP), or the like. This is not limited in this application.

The terminal device 200 is a device having a wireless transceiver function, and may be deployed on land, including an indoor or outdoor device, a hand-held device, a wearable device, or an in-vehicle device, may be deployed on water (for example, a ship), or may be deployed in the air (for example, an airplane, a balloon, or a satellite). The terminal device may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in remote surgery (remote medical), a wireless terminal in a smart grid, a wireless terminal in transportation safety, a wireless terminal in a smart city, a wireless terminal in a smart home, or the like. An application scenario is not limited in the embodiments of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

It should be noted that, the terms "system" and "network" can be used interchangeably in the embodiments of the present invention, "a plurality of" means two or more than two, and in view of this, "a plurality of" can be understood as "at least two" in the embodiments of the present invention. The term "and/or" describes an association relationship for associated objects and indicates that three relationships may exist. For example, A and/or B may indicate the following three cases: Only A exists, both A and B exist, and only B exists. In addition, a character "/" generally indicates an "or" relationship between the associated objects.

The communication method and apparatus provided in the embodiments of the present invention can be used for uplink transmission or downlink transmission. When the communication method is used for downlink transmission, a transmit end device may be a network side communications apparatus, and a receive end device may be a terminal side communications apparatus. When the communication method is used for uplink transmission, the transmit end device may be a terminal side communications apparatus, and the receive end device may be a network side communications apparatus. The network side communications apparatus includes a network device or a chip used for a network device (a baseband chip, a communications chip, or the like). The terminal side communications apparatus includes a terminal device or a chip used for a terminal device (a baseband chip, a communications chip, or the like). The communication method may alternatively be used for machine to machine communication, for example, vehicle to vehicle communication or device to device communication. Therefore, the transmit end device and the receive end device may be not merely limited to a network side communications apparatus and a terminal side communications apparatus that are peers for each other. For example, the transmit end device and the receive end device may be terminal side communications apparatuses that are peers for each other, or network side communications apparatuses that are peers for each other.

For ease of description in the following, that the network side communications apparatus is a network device and the terminal side communications apparatus is a terminal device is used as an example for description.

In a transmission unit, a PTRS is mapped, with a specific time domain density and a specific frequency domain density, to one or more OFDM symbols. The transmission unit may be a frame, a subframe, a slot, a mini-slot, an absolute time (for example, 5 ms), or the like.

Usually, the PTRS is used to track a rapid change of a channel, for example, track changes of a carrier frequency offset (CFO), phase noise (PN), and a Doppler shift. Usually, the PTRS occupies several subcarriers, resource elements (RE), resource blocks (RB), or resource bundles (RB) in frequency domain, and may occupy, in time domain, one or more OFDM symbols used for mapping the PTRS, for example, occupy some OFDM symbols by a specific spacing, or occupy all OFDM symbols, or occupy some OFDM symbols according to other rules. These rules may be set by standards, and preconfigured or prestored in the network device and the terminal device.

Optionally, the OFDM symbols used for mapping the PTRS are all symbols of a physical downlink shared channel (PDSCH) or a physical uplink shared channel (PUSCH), or all OFDM symbols except the one to which a DMRS is mapped. Another control channel may alternatively be used to map the PTRS. This is not limited in the present invention.

Figure 3A:
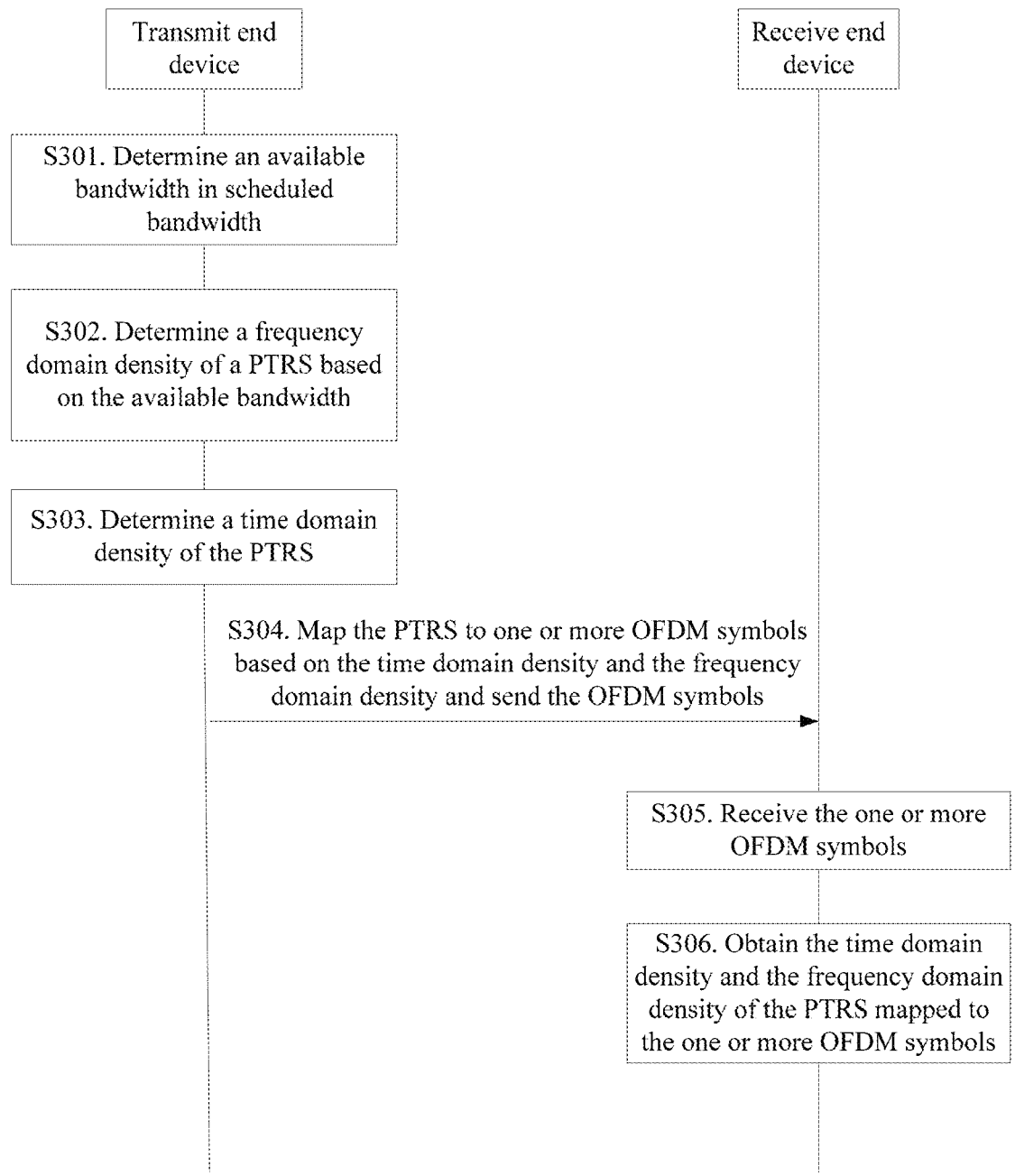
FIG. 3A is a schematic diagram of an interaction procedure of an information transmission method according to an embodiment of the present invention.

As shown in FIG. 3A, an embodiment of the present invention provides a reference signal configuration method. The configuration method may correspond to downlink transmission or uplink transmission, and include the following steps:

S301. A transmit end device determines an available bandwidth in scheduled bandwidth.

S302. The transmit end device determines a frequency domain density of a PTRS or a quantity of PTRSs in frequency domain based on the available bandwidth.

S303. The transmit end device determines a time domain density of the PTRS.

S304. The transmit end device maps the PTRS to one or more OFDM symbols and sends the OFDM symbols.

S305. A receive end device receives the one or more OFDM symbols.

S306. The receive end device obtains the time domain density and the frequency domain density of the PTRS mapped to the one or more OFDM symbols, or the quantity of the PTRSs in frequency domain.

Figure 3B:
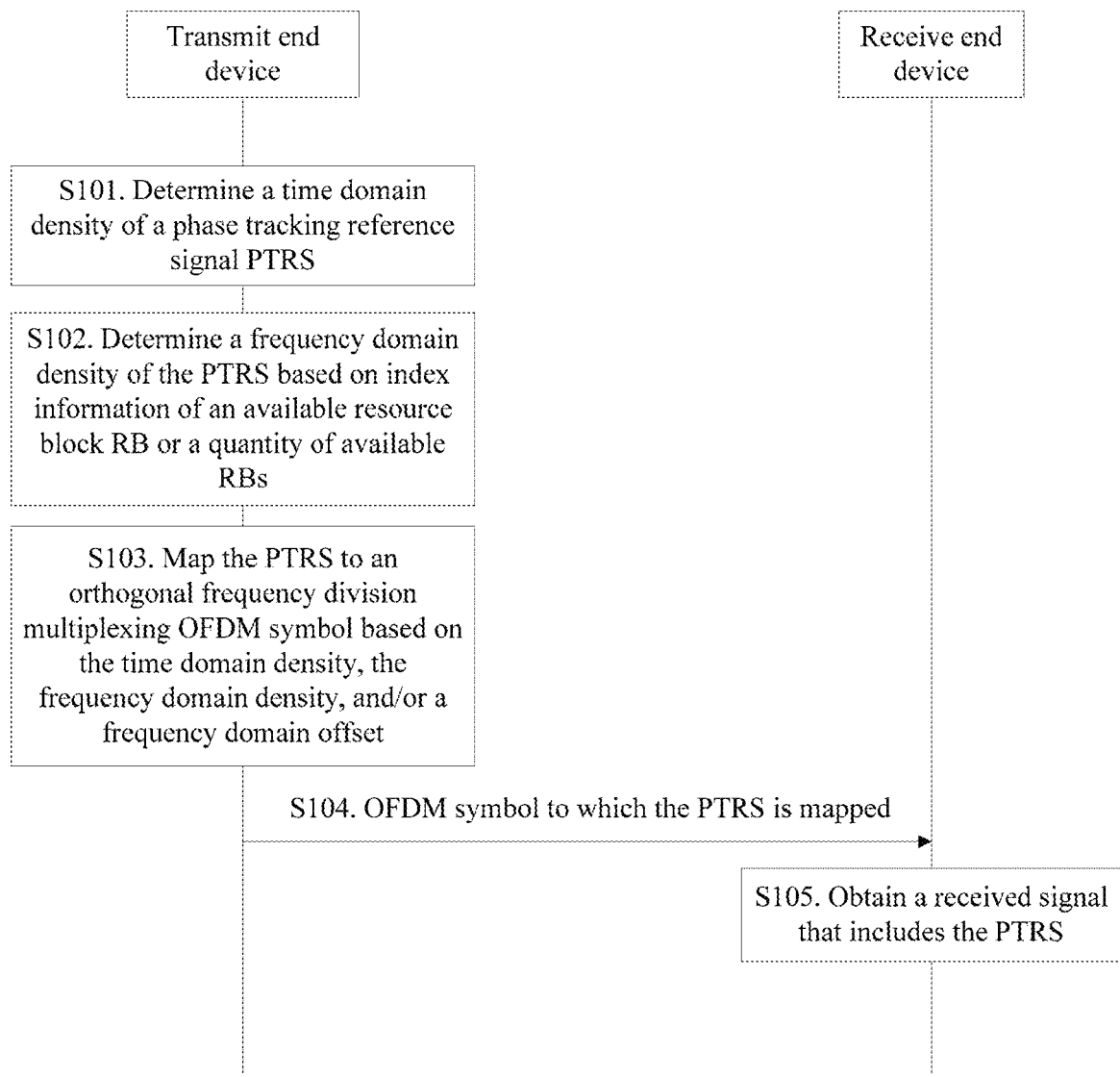
FIG. 3B is a schematic diagram of an interaction procedure of another information transmission method according to an embodiment of the present invention.

As shown in FIG. 3B, another embodiment of the present invention provides a reference signal configuration method.

The configuration method may correspond to downlink transmission or uplink transmission, and include the following steps.

S101. A transmit end device determines a time domain density of a PTRS.

S102. The transmit end device determines a frequency domain density of the PTRS based on index information of a scheduled RB or an available RB or a quantity of scheduled or available RBs.

S103. The transmit end device maps the PTRS to an OFDM symbol based on the time domain density and the frequency domain density.

In another implementation, the transmit end device maps the PTRS to an OFDM symbol based on the time domain density, the frequency domain density, and an offset.

S104. The transmit end device sends a signal that includes the OFDM symbol to which the PTRS is mapped.

S105. The receive end device receives a signal that includes the PTRS, and obtains the PTRS.

The PTRS configuration needs to be considered from two dimensions: time domain and frequency domain.

Time Domain Dimension:

With regard to mapping of a PTRS in time domain, the PTRS may be distributed on a physical channel scheduled for a user. The physical channel includes a physical uplink shared channel (PUSCH), a physical downlink shared channel (PDSCH), or the like. For ease of description, the following uses the PUSCH or the PDSCH as an example for description.

Figure 4:
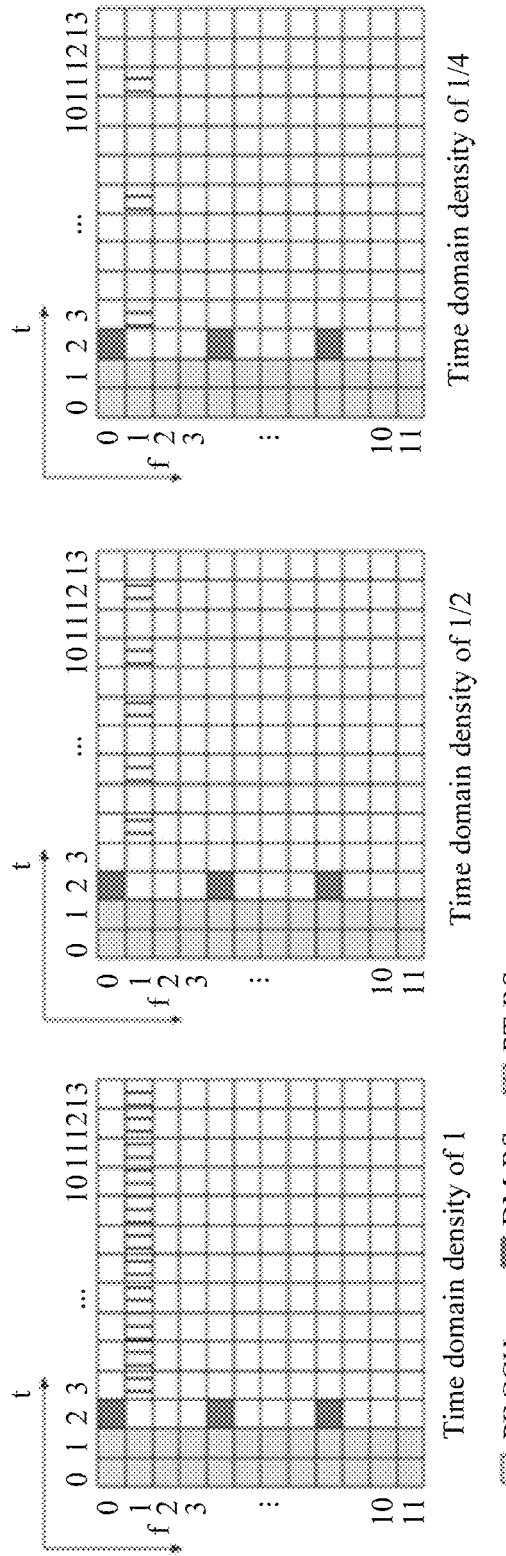
FIG. 4 shows several example time domain densities of a PTRS.

FIG. 4 shows several examples of mapping of a PTRS in time domain. As shown in FIG. 4, a PDCCH is mapped to a symbol 0 and a symbol 1, and occupies all 12 RBs. A DMRS is mapped to a symbol 2, and occupies an RB 0, an RB 4, and an RB 8. However, the PTRS (namely, a PT-RS in FIG. 4; the PTRS may also be referred to as a PT-RS, and is collectively referred to as the PTRS in this specification) may be continuously mapped to symbols 3 to 13 ("a time domain density of 1" shown in FIG. 4), may be mapped once every two symbols and mapped to symbols 4, 6, 8, 10, and 12 ("a time domain density of 1/2" shown in FIG. 4), or may be mapped once every four symbols and mapped to symbols 3, 7, and 11 (that is, "a time domain density of 1/4" shown in FIG. 4).

Figure 5:
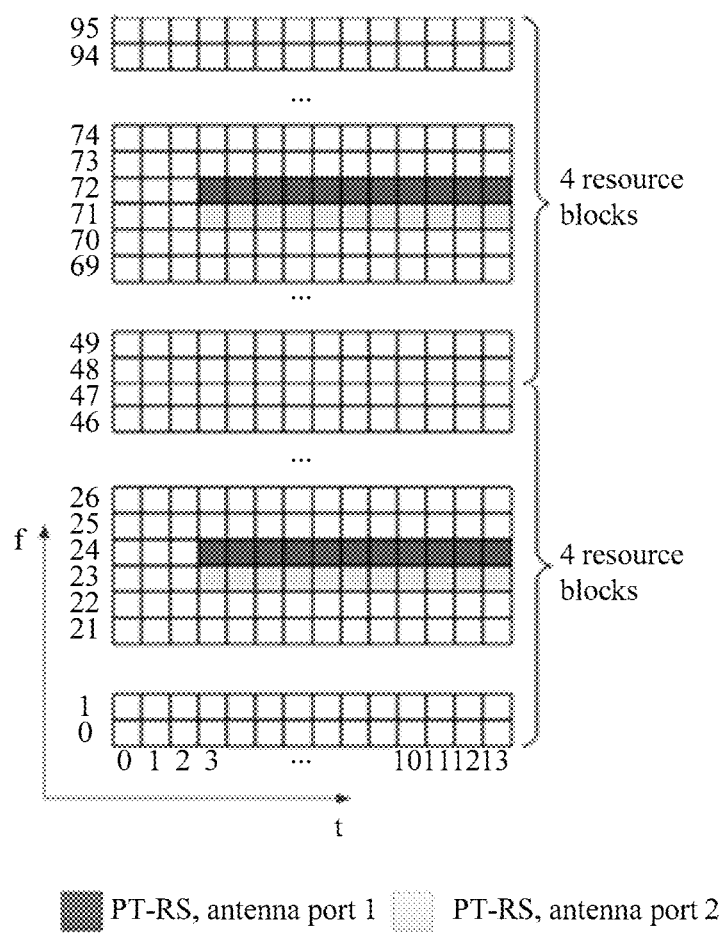
FIG. 5 is a schematic diagram of an example of PTRS mapping in frequency domain.

FIG. 5 shows an example of PTRS mapping in frequency domain. As shown in FIG. 5, the PTRS occupies one subcarrier every four resource blocks in frequency domain. A frequency division multiplexing (FDM) mode may be used for PTRSs of different users. A PTRS of a user 1 and a PTRS of a user 2 occupy different subcarriers. It may be understood that, another multiplexing manner, such as time division multiplexing (TDM) or code division multiplexing (CDM) may be used for PTRSs of different users. This is not limited herein.

Optionally, an index of a start symbol mapped to the PTRS may be determined based on the time domain density of the PTRS. For example, for uplink data transmission, if the time domain density of the PTRS is the foregoing "time domain density of 1", the start symbol mapped to the PTRS may be a $1^{st}$ symbol subsequent to the symbols occupied by a PDCCH and a DM-RS, namely, a symbol "3" in the resource blocks (if the resource block occupies only one symbol, the "resource block" herein may alternatively be understood as a "slot" from the perspective of a time domain). If the time domain density of the PTRS is the foregoing "time domain density of 1/2", the start symbol mapped to the PTRS may be a $2^{nd}$ symbol subsequent to the symbols occupied by a PDCCH and a DM-RS, namely, a symbol "4" in the resource blocks. If the time domain density of the PTRS is the foregoing "time domain density of 1/4", the start symbol mapped to the PTRS may be a $1^{st}$ symbol subsequent to the symbols occupied by a PDCCH and a DM-RS, namely, the symbol "3" in the resource blocks. It should be noted that, the time domain density of the PTRS and a mapping relationship between the time domain density of the PTRS and the index of the start symbol mapped to the PTRS may be predefined by a protocol, or may be configured by a network device to a terminal device by using higher layer signaling (for example, radio resource control (RRC) signaling), or a media access control element (MAC-CE), or downlink control information (DCI).

According to the foregoing description, the time domain density of the PTRS means a density with which the PTRS is mapped in time domain. For example, the PTRS is mapped once every several symbols. For example, the PTRS may be continuously mapped to every symbol on a PUSCH (or a PDSCH), or mapped once every two symbols on a PUSCH (or a PDSCH), or mapped once every four symbols on a PUSCH (or a PDSCH). In an implementation, the time domain density of the PTRS may be determined based on a modulation and coding scheme. In another implementation, the time domain density of the PTRS may alternatively be related to one or more of the following parameters: bandwidth (sometimes may be referred to as a bandwidth part (BP)), a cyclic prefix (CP) type, a subcarrier spacing, a phase noise model, a phase noise level, a center frequency, and a receiver capacity. The time domain density of the PTRS may have a correspondence with the MCS and the at least one parameter. Different MCSs, BPs, CP types, subcarrier spacings, phase noise models, phase noise levels, center frequencies, or receiver capacities may correspond to different time domain densities. The correspondence between the one or more parameters and the time domain density may be predefined by a protocol, or preconfigured, or prestored, or configured by the network device by using the higher layer signaling (for example, the RRC signaling).

For example, the time domain density of the PTRS may be determined based on the subcarrier spacing and a modulation order. Specifically, for one determined subcarrier spacing, one or more MCS thresholds may be predefined/preconfigured/prestored, or configured by using higher layer signaling. All MCSs between two adjacent MCS thresholds correspond to a same time domain density of the PTRS, as shown in Table 3:

TABLE 3

| Modulation and coding scheme | Time domain density of a PTRS |
| --- | --- |
| 0 ≤ MCS < MCS_1 | 0 |
| MCS_1 ≤ MCS < MCS_2 | 1/4 |
| MCS_2 ≤ MCS < MCS_3 | 1/2 |
| MCS_3 ≤ MCS | 1 |

MCS_1, MCS_2, and MCS_3 are MCS thresholds. "1", "1/2", and "1/4" in the time domain density are respectively the three time domain densities shown in FIG. 4. It may be understood that, the modulation order and the time domain density of the PTRS in Table 3 may alternatively be identified by using their indexes to set up a correspondence, for example, a correspondence between an index of the modulation and coding scheme $I_{MCS}$ and the time domain density of the PTRS, a correspondence between the modulation and coding scheme and an index of the time domain density of the PTRS, or a correspondence between an index of the modulation and coding scheme $I_{MCS}$ and an index of the time domain density of the PTRS.

For example, a value of the modulation and coding scheme MCS is referred to as the index of the MCS ($I_{MCS}$). In LTE, the MCS is used to indicate the modulation order and a code rate, and one index of the MCS corresponds to one modulation order and one code rate. For example, according to the protocols of the 3GPP R14 version, one index of the MCS corresponds to one modulation order and one transport block size (TBS), and an index of the TBS is a parameter corresponding to the code rate, as shown in Table 4:

TABLE 4

| Index of the MCS $I_{MCS}$ | Modulation order $Q'_m$ | Transport block set size $I_{TBS}$ | Redundancy version RVidx |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | Reserved | 1 |
| 30 | | | 2 |
| 31 | | | 3 |

Therefore, a comparison between the MCS and the thresholds MCS_1, MCS_2, and MCS_3 described in the embodiments of the present invention is actually a comparison between the $I_{MCS}$ and the thresholds MCS_1, MCS_2, and MCS_3.

It should be understood that values of the indexes $I_{MCS}$ in Table 4 are merely used as examples. The value of the index may be set, according to a system design requirement, as another value by which a corresponding MCS can be indexed. The value of the $I_{MCS}$ is not limited in the embodiments of the present invention.

Frequency Domain Dimension:

With regard to mapping of a PTRS in frequency domain, a subcarrier carrying the PTRS is distributed within bandwidth scheduled for a user. For example, mapping may be performed by using a granularity of a resource block RB or a resource bundle RB, or by using another granularity, for example, a resource element (RE). The bandwidth scheduled for a user ("scheduled bandwidth" or a "scheduled resource" for short) may be bandwidth that is scheduled for the user for transmitting a data service and a control signal of the user.

In frequency domain, the PTRS may occupy a plurality of RBs, or one PTRS is mapped every several RBs.

The scheduled bandwidth is one section of time-frequency resource allocated by the network device to the terminal device. Usually, the scheduled bandwidth is indicated to the terminal device by using the DCI. An available bandwidth is scheduled bandwidth that does not include preoccupied bandwidth (or scheduled bandwidth except the preoccupied bandwidth or subtracting the preoccupied bandwidth). When some of time-frequency resources allocated to the terminal device are occupied by another signal, the bandwidth occupied by the another signal is the preoccupied bandwidth. The preoccupied bandwidth may also be referred to as collided bandwidth or occupied bandwidth. The available bandwidth may also be referred to as residual bandwidth or effective bandwidth.

Figure 6A:
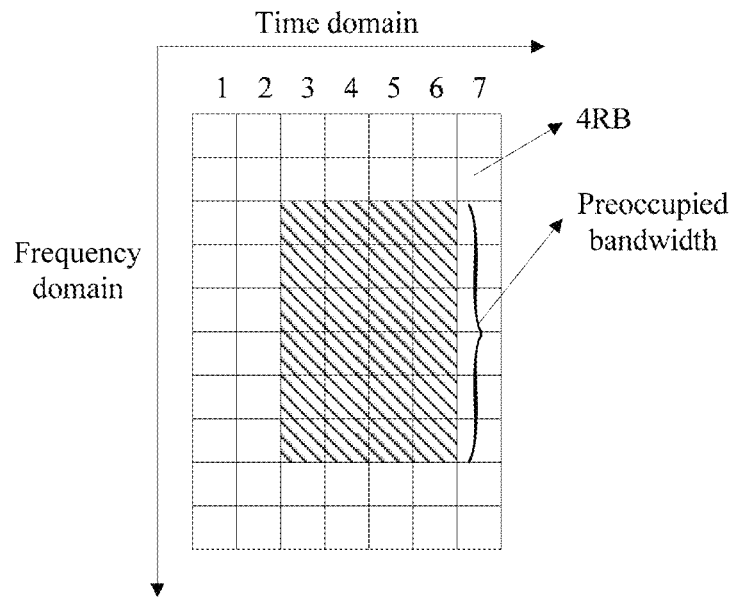
FIG. 6A is a schematic diagram of an example of available bandwidth.

As shown in FIG. 6A, it is assumed that a scheduled resource allocated to a terminal device is a time-frequency resource with seven symbols in time domain and 40 RBs in frequency domain. Each RB occupies one OFDM symbol in time domain and occupies 12 subcarriers in frequency domain. The RB may be a resource block (RB) or a resource bundle (RB).

Symbols 3, 4, 5, and 6 in time domain and RBs 9 to 32 in frequency domain are occupied by a synchronization block (Synchronization Signal Block, SS block), that is, the preoccupied bandwidth shown in FIG. 4. Therefore, the available bandwidths on a $1^{st}$ OFDM symbol to a $7^{th}$ OFDM symbol are respectively as follows:

{40 RBs, 40 RBs, 16 RBs, 16 RBs, 16 RBs, 16 RBs, 40 RBs}. Optionally, determining an available bandwidth in scheduled bandwidth includes:

subtracting the preoccupied bandwidth and the reserved bandwidth from the scheduled bandwidth to obtain the available bandwidth.

The reserved bandwidth identifies a time-frequency resource that is reserved by a network device and may be used to transmit a particular signal in the future.

Figure 6B:
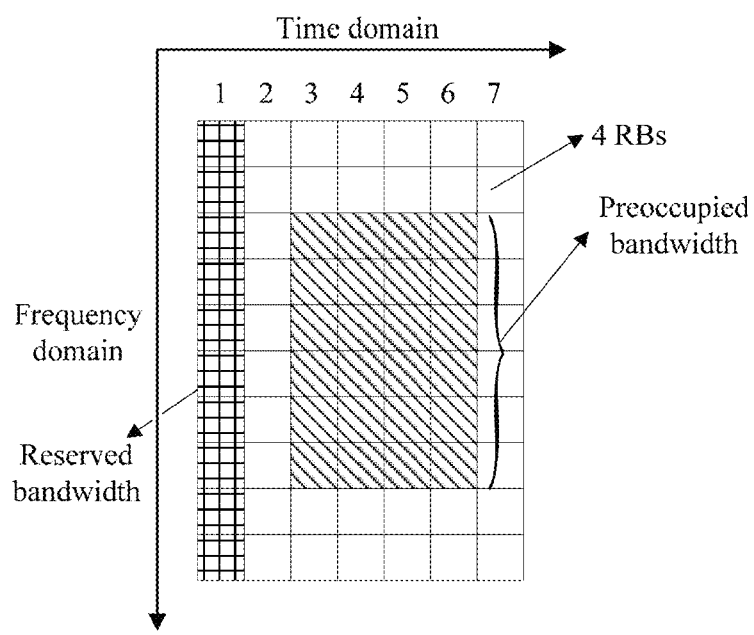
FIG. 6B is a schematic diagram of another example of available bandwidth.

As shown in FIG. 6B, it is assumed that a scheduled resource allocated to the terminal is a time-frequency resource with seven symbols in time domain and 40 RBs in frequency domain. Each RB occupies one OFDM symbol in time domain and occupies 12 subcarriers in frequency domain.

Symbols 3, 4, 5, and 6 in time domain and RBs 9 to 32 in frequency domain are occupied by the SS block, that is, the preoccupied bandwidth shown in FIG. 5. In addition, a symbol 1 in time domain is the reserved bandwidth. Therefore, the available bandwidths on symbols are respectively as follows:

{0 RBs, 40 RBs, 16 RBs, 16 RBs, 16 RBs, 16 RBs, 40 RBs}.

The reference signal configuration method according to the embodiments of the present invention may be applied to a scenario in which another signal occupies a time-frequency resource on some OFDM symbols within scheduled bandwidth (or referred to as a scheduled resource) allocated to a terminal device. The another signal may be a downlink signal (applicable to a scenario in which the method is applied to downlink transmission), or an uplink signal (corresponding to a scenario in which the method is applied to uplink transmission). The downlink signal may be one or more of the following:

a synchronization block (Synchronization Signal block, SS block), a physical downlink control channel (PDCCH), an enhanced physical downlink control channel (EPDCCH), a physical broadcast channel (PBCH), a primary synchronization signal (PSS), a secondary synchronization signal (SSS), a demodulation reference signal (DMRS), and a channel state information-reference signal (CSI-RS).

Further, when the downlink signal is a CSI-RS, because the time-frequency resource occupied by the CSI-RS may be discontinuous, the preoccupied bandwidth is bandwidth equivalent to a quantity of resource elements (REs) occupied by the CSI-RS in frequency domain. In other words, the preoccupied bandwidth is a value of INT(NumRE/12). The NumRE represents the quantity of the REs occupied by the CSI-RS in frequency domain. The INT(x) may be rounding up, rounding down, or rounding off.

The uplink signal may be one or more of the following: a physical uplink control channel (PUCCH), a demodulation reference signal DMRS, and a sounding reference signal (SRS).

To prevent conflicting or colliding with the preoccupied bandwidth, the PTRS may be mapped to the available bandwidth. An implicit correlation between the frequency domain density and the available bandwidth may be shown in Table 5.

TABLE 5

| Available bandwidth | Frequency domain density |
|---|---|
| 0 ≤ NRB < NRB1 | Skipping mapping a PTRS |
| NRB1 ≤ NRB < NRB2 | FD1 |
| NRB2 ≤ NRB < NRB3 | FD2 |
| NRB3 ≤ NRB < NRB4 | FD3 |
| NRB4 ≤ NRB < NRB5 | FD4 |
| NRB5 ≤ NRB | FD5 |

NRB1, NRB2, NRB3, NRB4, and NRB5 are predetermined or preset bandwidth thresholds.

Optionally, a value of the frequency domain density FD may be 0, 1/2, 1/4, 1/8, or 1/16, and 1/N indicates that one PTRS is mapped every N RBs.

Optionally, the frequency domain density may be referred to as a frequency domain quantity. The frequency domain quantity is a quantity of the PTRS symbols that are mapped to the available bandwidth. For example, an implicit correlation between the frequency domain quantity and the available bandwidth may be shown in Table 6.

TABLE 6

| Available bandwidth | Frequency domain quantity |
|---|---|
| 0 ≤ NRB < NRB1 | Skipping mapping a PTRS |
| NRB1 ≤ NRB < NRB2 | 1 |
| NRB2 ≤ NRB < NRB3 | 2 |
| NRB3 ≤ NRB < NRB4 | 4 |
| NRB4 ≤ NRB < NRB5 | 8 |
| NRB5 ≤ NRB | 16 |

NRB1, NRB2, NRB3, NRB4, and NRB5 are predetermined or preset bandwidth thresholds.

It should be understood that, values 1, 2, 4, 8, and 16 in Table 6 are merely examples. This is not limited in the present invention.

It should be understood that, Table 5 or Table 6 is merely an example of a correspondence list. Rows of the table may be more or less. For example, the rows of the table may be directly increased or decreased; or a value on the left is made to be equal to a value on the right, to invalid a corresponding row. In addition, the table is merely an expression form of the correspondence list, and the correspondence list can also be expressed by using a formula, for example, Formula (1).

A person skilled in the art may understand that, the correspondence list may alternatively be expressed in another form. This is not limited in this application.

$$D_F = \begin{cases} 0 & 0 \le N_{PRB} < T_{RB}^1 \\ 1 & T_{RB}^1 \le N_{PRB} < T_{RB}^2 \\ 1/2 & T_{RB}^2 \le N_{PRB} < T_{RB}^3 \\ 1/4 & T_{RB}^3 \le N_{PRB} < T_{RB}^4 \\ 1/8 & T_{RB}^4 \le N_{PRB} < T_{RB}^5 \\ 1/16 & T_{RB}^5 \le N_{PRB} \end{cases} \quad (1)$$

For example, it is assumed that a base station preconfigures a PTRS for UE 1. According to Table 3, the time domain density of 1/2 means that one PTRS is mapped every two symbols. For example, the PTRS needs to be mapped to symbols 1, 3, 5, and 7 in FIG. 7A.

Figure 7A:
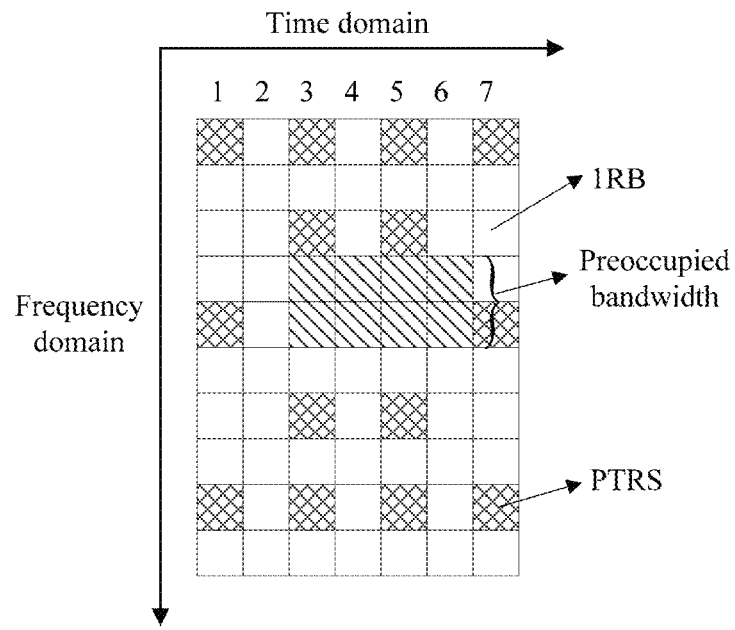
FIG. 7A is a schematic diagram of PTRS mapping according to an embodiment of the present invention.

For example, as shown in FIG. 7A, available bandwidths on the symbols 1, 3, 5, and 7 are respectively 10 RBs, 8 RBs, 8 RBs, and 10 RBs by calculation.

The available bandwidths of symbols 1 and 7 are 10 RBs. If the available bandwidths belong to the interval NRB2≤NRB<NRB3 in Table 5, the corresponding frequency domain density is FD2, for example, 1/4.

The available bandwidths of symbols 3 and 5 are 8 RBs. If the available bandwidths belong to the interval NRB1≤NRB<NRB2 in Table 5, the corresponding frequency domain density is FD1, for example, 1/2.

A pattern of mapped PTRSs is shown in FIG. 7A:

On the symbol 1, PTRSs are respectively mapped to an RB 1, an RB 5, and an RB 9.

On the symbol 3, PTRSs are respectively mapped to an RB 1, an RB 3, an RB 7, and an RB 9.

Likewise, on the symbol 5, PTRSs are respectively mapped to an RB 1, an RB 3, an RB 7, and an RB 9.

On the symbol 7, PTRSs are respectively mapped to an RB 1, an RB 5, and an RB 9.

Figure 7B:
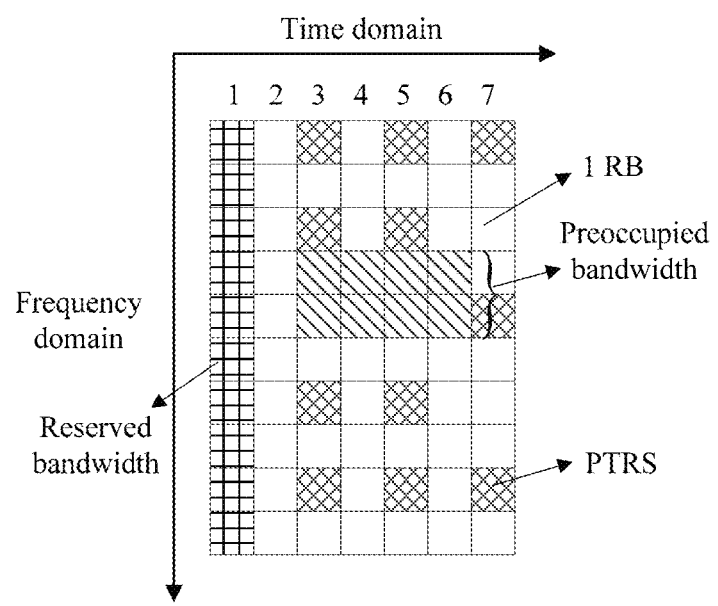
FIG. 7B is a schematic diagram of another type of PTRS mapping according to an embodiment of the present invention.

For another example, available bandwidths on the symbols 1, 3, 5, and 7 are respectively 0 RBs, 8 RBs, 8 RBs, and 10 RBs by calculation, as shown in FIG. 7B.

According to Table 8, if an available bandwidth of a first symbol is 0 RBs, no PTRS is mapped.

When the available bandwidth on the symbol 3 is 8 RBs and belongs to the interval NRB1≤NRB<NRB2 in Table 5, the corresponding frequency domain density is FD1, for example, 1/2.

Likewise, the available bandwidth on the symbol 5 is 8 RBs, and the frequency domain density is also 1/2.

When the available bandwidth on the symbol 7 is 10 RBs and belongs to the interval NRB2≤NRB<NRB3 in Table 5, the corresponding frequency domain density is FD2, for example, 1/4.

A pattern of mapped PTRSs is shown in FIG. 7B:

On the symbol 1, no PTRS is mapped.

On the symbol 3, PTRSs are respectively mapped to an RB 1, an RB 3, an RB 7, and an RB 9.

Likewise, on the symbol 5, PTRSs are respectively mapped to an RB 1, an RB 3, an RB 7, and an RB 9.

On the symbol 7, PTRSs are respectively mapped to an RB 1, an RB 5, and an RB 9.

It should be noted that, on the symbol 3 and the symbol 5, when the frequency domain density is 1/2, it indicates that PTRSs are mapped to the RBs 1, 3, 5, 7, and 9. However, an RB 4 and the RB 5 are preoccupied bandwidth. Therefore, when one PTRS is mapped every two RBs, the PTRSs are mapped to the RBs 1, 3, 7, and 9.

In this embodiment, the correspondence between the scheduled or available RB and the frequency domain density of the PTRS is set up, and the frequency domain density of the PTRS is determined based on the scheduled or available RB. The scheduled or available RB is an RB included on scheduled or available bandwidth. In a possible implementation, the scheduled or available RB may be indicated by using index information of the RB or a quantity of the scheduled or available RBs. For example, for N scheduled or available RBs, index information of the RBs may be 0 to N−1 or 1 to N, where N is an integer greater than or equal to 1.

In addition, in frequency domain, the scheduled or available bandwidth may be identified by using the scheduled or available RB, for example, may be identified by using an index of the scheduled or available RB, or a quantity of the scheduled or available RBs. In this embodiment, the correspondence between the scheduled or available RB and the frequency domain density of the PTRS is set up. For example, the scheduled or available RB is divided into one or more intervals, and each interval corresponds to a frequency domain density of the PTRS.

For example, a network device preconfigures a correspondence between index intervals of a plurality of scheduled or available resource blocks RBs and frequency domain densities of a plurality of PTRSs, as shown in Table 7.

TABLE 7

| Index intervals of scheduled or available resource blocks | Frequency domain density of a PTRS |
| --- | --- |
| $0 \leq I_{RB} < I_{RB1}$ | Skipping setting a PTRS |
| $I_{RB1} \leq I_{RB} < I_{RB2}$ | $FD_1$ |
| $I_{RB2} \leq I_{RB} < I_{RB3}$ | $FD_2$ |
| $I_{RB3} \leq I_{RB} < I_{RB4}$ | $FD_3$ |
| $I_{RB4} \leq I_{RB}$ | $FD_4$ |

In Table 7, $I_{RB1}$, $I_{RB2}$, $I_{RB3}$, and $I_{RB4}$ respectively represent indexes of thresholds of scheduled or available RBs corresponding to different frequency domain densities of the PTRS. Table 7 shows an example of dividing the scheduled or available RBs into five intervals. A person skilled in the art may understand that, the scheduled or available RB may be configured as one or more intervals based on a system requirement, thereby setting up a correspondence between each interval and the frequency domain density of the PTRS.

Figure 8A:
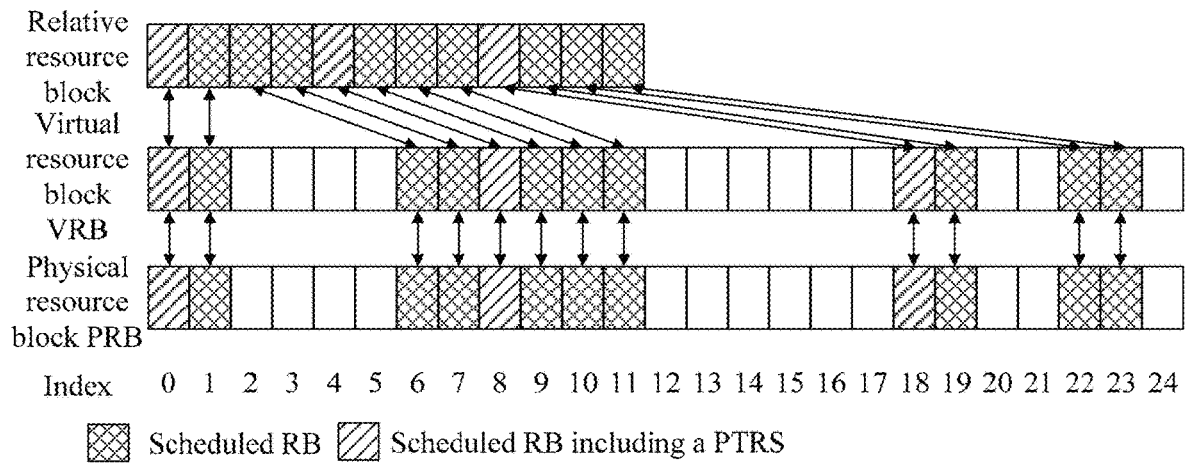
FIG. 8A is a schematic diagram of a relationship between a relative resource block number and a VRB/PRB.
Figure 8B:
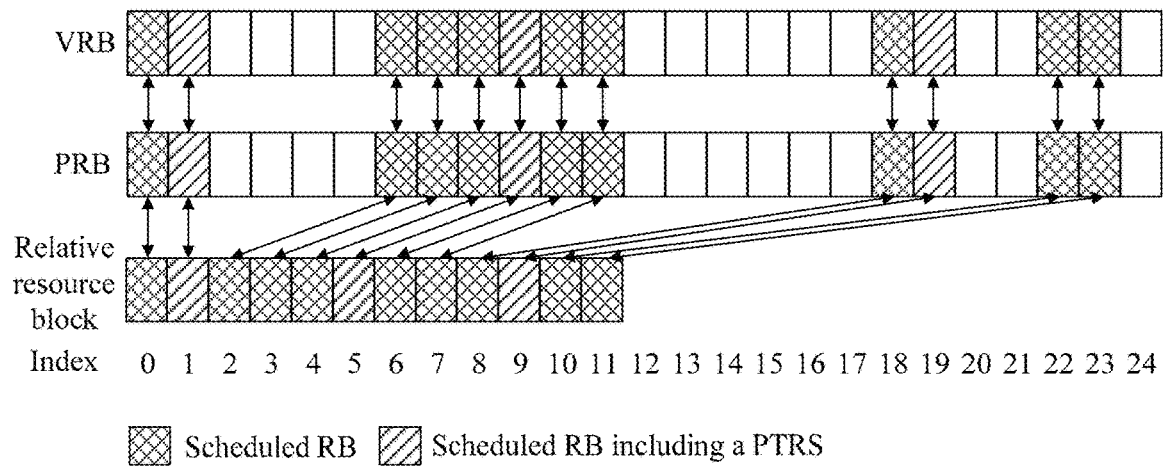
FIG. 8B is a schematic diagram of another relationship between a relative resource block number and a VRB/PRB.

The index of the scheduled or available RB may be a serial number or a relative serial number of the resource block. FIG. 8A and FIG. 8B show a schematic diagram of a correspondence between a relative resource block RB and a virtual resource block VRB/physical resource block PRB. In a possible implementation, the relative serial number of the scheduled or available resource block in FIG. 8A is a serial number obtained after serial numbers of scheduled virtual resource blocks (VRB) are sorted. In another implementation, the relative serial number of the scheduled or available resource block in FIG. 8B is a serial number obtained after serial numbers of scheduled physical resource blocks (PRB) are sorted. A mapping relationship between the VRB and the PRB may be indicated by a network device to a terminal device. One concept opposite to the relative serial number is an absolute serial number. The absolute serial number of the resource block is an unsorted serial number of the VRB and the PRB.

The network device may send the correspondence between the frequency domain density of the PTRS and the scheduled or available RB (or may not send but prestore the correspondence in the terminal device) and scheduling information to the terminal device. The scheduling information includes information such as scheduled bandwidth and an MCS. The sending of the scheduling information herein should be described from two aspects. For downlink transmission, the network device sends the scheduling information before sending an OFDM symbol, or the scheduling information may be simultaneously sent with the OFDM symbol. For uplink transmission, the network device needs to send the scheduling information to the terminal device before the terminal device sends the OFDM symbol.

Figure 9:
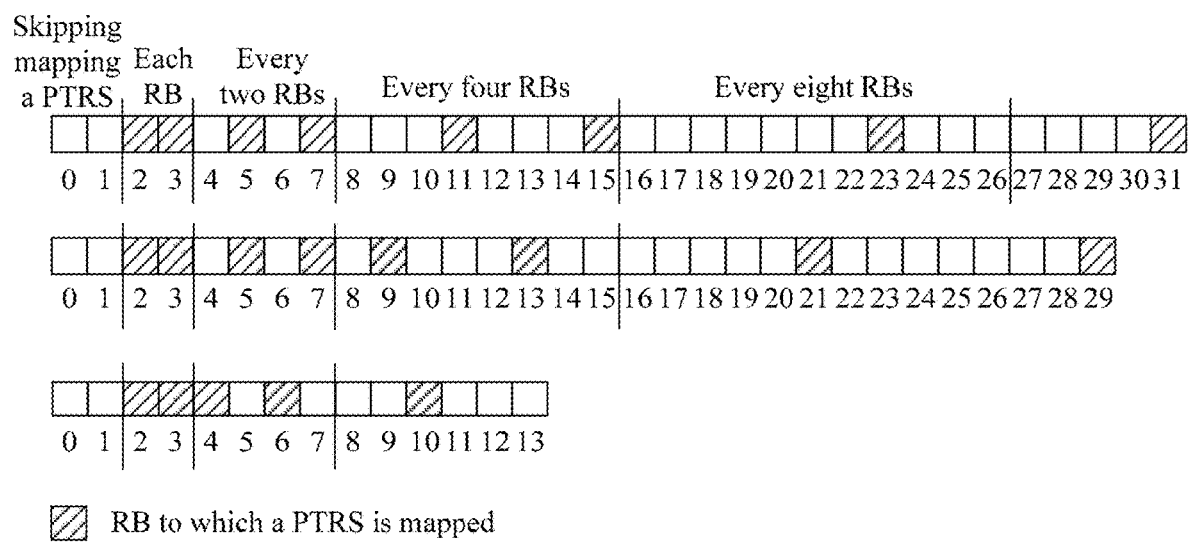
FIG. 9 is a schematic diagram of an example of interval division and frequency domain mapping of a scheduled RB or an available RB.

The transmit end device determines the time domain density of the PTRS based on the MCS, and divides intervals of the scheduled or available RB based on the scheduling information. FIG. 9 shows an example of interval division and frequency domain mapping of a scheduled RB or an available RB. As shown in FIG. 9, uppermost 32 RBs (an RB 0 to an RB 31) are divided into five RB index intervals, middle 30 RBs (an RB 0 to an RB 29) are divided into five RB index intervals, and downmost 14 RBs (an RB 0 to an RB 13) are divided into four RB index intervals. The frequency domain densities of the PTRS corresponding to RB index intervals may be different.

In another possible implementation, a frequency domain offset is also taken into consideration for PTRS configuration in frequency domain. A correspondence between an RB interval (for example, an RB index interval or an RB quantity interval) and the frequency domain offset can be set up. For example, each RB interval corresponds to one frequency domain offset. The following uses the RB index interval as an example for description.

In a possible design, different RB index intervals may correspond to different frequency domain offsets. The frequency domain offset of a given RB index interval can be obtained by calculation. For example, the frequency domain offset may be a remainder between an offset and the frequency domain density corresponding to the RB index interval. If $I_{RB1}=2$, $I_{RB2}=4$, $I_{RB3}=8$, and $I_{RB4}=16$, when scheduled bandwidths are respectively 32 RBs, 30 RBs, and 14 RBs, the mapping of the PTRS is shown in FIG. 9. A maximum value of the offset may be determined by a minimum frequency domain density that can be configured by current scheduled bandwidth. For example, when one PTRS is mapped every 8 RBs, the maximum offset is 7 RBs. Therefore, the frequency domain offset of the PTRS within the scheduled/scheduled or available/effective bandwidth is mod(Offset, FDi). As shown in FIG. 9, when the Offset is 7:

for RBs whose serial numbers are 2 to 3, the frequency domain offset of the PTRS is mod(7,1)=0;

for RBs whose serial numbers are 4 to 7, the frequency domain offset of the PTRS is mod(7,2)=1;

for RBs whose serial numbers are 8 to 15, the frequency domain offset of the PTRS is mod(7,4)=3; and for RBs whose serial numbers are 16 to 31, the frequency domain offset of the PTRS is mod(7,8)=7.

In another possible design, the frequency domain offset of each RB index interval is a preset value (for example, a fixed value or a configurable value). The preset value may be predefined or the preset value may be configured by signaling. The signaling includes RRC, a media access control control element, downlink control information, and the like.

In still another possible design, a correspondence list of the frequency domain offset of each RB index interval and the RB index interval is set up. For example, the correspondence list may be defined by a protocol, or prestored, or configured by using signaling. The signaling includes RRC, a media access control control element, downlink control information, and the like.

According to the foregoing description, the time domain density, frequency domain density, and frequency domain offset of the PTRS can be determined. The PTRS is mapped to the OFDM symbol based on the time domain density, frequency domain density, and frequency domain offset of the PTRS.

It may be learned from FIG. 9 that, for same scheduled bandwidth, PTRSs of different frequency domain densities are mapped in different RB index intervals, so that the PTRSs in each RB index interval of the scheduled bandwidth are distributed uniformly, thereby reducing the difficulty of dealing with a collision with another RS or channel, and avoiding a case in which the quantity of the PTRSs in frequency domain decreases because of an increased scheduled bandwidth.

It should be noted that, a terminal device can negotiate with a network side on time-frequency configuration of the PTRS. For example, the terminal device may feed back or suggest how to configure the PTRS, the network device modifies or confirms by using signaling, and the signaling of modification or confirmation may be RRC, a MAC-CE, DCI, and the like.

In S104, the transmit end device sends a signal that includes the OFDM symbol to which the PTRS is mapped to the receive end device. The receive end device obtains the PTRS after receiving the signal that includes the OFDM symbol to which the PTRS is mapped.

After S105, the method may further include the following step: estimating a common phase error based on the received signal of the PTRS. To be specific, a CPE (theta) may be estimated through the received signal of the PTRS A*exp (1j*theta)+noise being divided or multiplied by a transmitted signal of the PTRS A for conjugation. Impact of noise may be reduced by using an average value of a plurality of PTRS results.

According to a communication method provided in the embodiments of the present invention, the frequency domain density of the PTRS is determined based on the scheduled or available resource block (for example, the index of the scheduled or available RB or the quantity of the scheduled or available RBs), and the PTRS is mapped to the OFDM symbol based on the time domain density, the frequency domain density, and the frequency domain offset of the PTRS, so that a quantity of PTRSs can be prevented from jumping when a value of scheduled bandwidth is close to a threshold, both accuracy of common phase error estimation and spectral efficiency are taken into consideration, and the PTRSs can be uniformly mapped in the scheduled or available bandwidth, thereby properly configuring the PTRSs.

It should be noted that, the scheduling of the virtual resource block (VRB) or the physical resource block (PRB) may be discrete or continuous. In order to ensure the quantity of the PTRSs mapped to the scheduled or available bandwidth, the serial number of the RB is a relative serial number obtained after the VRB serial numbers or PRB serial numbers allocated to a terminal are sorted from a small value to a larger value, or from a large value to a smaller value, or according to another rule. For example, if the PRB serial numbers allocated to the terminal are a PRB 0, a PRB 1, a PRB 2, a PRB 3, a PRB 6, a PRB 7, a PRB 10, a PRB 11, a PRB 14, a PRB 15, a PRB 16, a PRBG 17, a PRB 18, a PRB 19, a PRB 22, and a PRB 23, totally 16 RBs, and assuming that the corresponding frequency domain density is 1/4, there should be totally four PTRSs. If based on the absolute serial numbers of the PRBs, that is, the PTRSs are mapped to the RBs of absolute serial numbers 0, 4, 8, 12, . . . , only the PRB 0 and the PRB 16 have the PTRS. Therefore, the PTRS should be mapped based on the relative serial numbers 0, 1, 2, . . . , 15 of the PRB. That is, the PTRS is mapped to the PRB 0 (corresponding to a relative serial number 0), the PRB 6 (corresponding to a relative serial number 4), the PRB 14 (corresponding to a relative serial number 8), and the PRB 18 (corresponding to a relative serial number 12).

The foregoing implicit correlation and a start location of the PTRS are merely examples, and this is not limited in the present invention. The foregoing another channel or synchronization block is merely an example, and may alternatively be a PUCCH, a machine type communication PDCCH (MPDCCH), or another channel/signal/RS occupying a non-negligible resource in addition to the PDCCH, the PBCH, the PSS, the SSS, and the EPDCCH. This is not limited in the present invention. The occupied resource is continuous, and may be discontinuous in an actual case, for example, the EPDCCH. If the occupied resource is discontinuous, the PTRS may be mapped to a virtual resource or physical resource after determining first the location of the PTRS on the scheduled or available bandwidth.

By using symbol-based determining methods of the frequency domain density of the PTRS, the quantity of PTRSs in frequency domain, and the location of the PTRS in frequency domain, and the PTRS mapping method, a PTRS overhead and performance improvement brought by an introduced PTRS, on each symbol, can achieve a best combination, thereby maximizing spectral efficiency.

Optionally, when the method in FIG. 3A or FIG. 3B corresponds to downlink, the method further includes the following step:

sending information used to indicate the scheduled bandwidth to the terminal device.

Optionally, the method further includes the following step:

sending information used to indicate the preoccupied bandwidth or the scheduled or available bandwidth to the terminal device.

Optionally, the method further includes the following step:

sending information used to indicate the reserved bandwidth to the terminal device.

Correspondingly, when the method corresponds to uplink, optionally the method 300 further includes:

receiving the information indicating the scheduled bandwidth from the network device.

Optionally, the method further includes the following step:

receiving the information indicating the preoccupied bandwidth or the scheduled or available bandwidth from the network device.

Optionally, the method further includes the following step:

receiving the information indicating the reserved bandwidth from the network device.

When the network device allocates or indicates the scheduled bandwidth, the preoccupied bandwidth, the scheduled or available bandwidth, or the reserved bandwidth to the terminal device, the scheduled bandwidth needs to be indicated by using downlink signaling, for example, downlink control information (DCI). According to the existing LTE standard protocol, there are three types of methods for the network device to indicate bandwidth: a resource allocation mode 0 (a Type 0), a resource allocation mode 1 (a Type 1), and a resource allocation mode 2 (a Type 2). A type specifically to be used depends on a selected DCI format and configuration of a related bit in the DCI. For a type supported by each DCI format and a bit related to the resource allocation, refer to the related description of section 5.3.3 of TS36.212 of an LTE system, or the type supported by each DCI format and the bit related to the resource allocation may be re-stipulated by the protocol, or may be configured by redesigning a DCI format.

For example, the following briefly describes the resource allocation mode 0.

The DCI using the resource allocation mode 0 is DCI 1, DCI 2, DCI 2A, and DCI 2B. These pieces of DCI all have a field about resource allocation that is used to indicate an RB allocated to UE. For example, according to a DCI 2A format in FIG. 10, when the resource allocation mode 0 is used, a bitmap table of $\lceil N_{DL}^{RB}/P \rceil$ bits is used to represent the allocation of RBs. $N_{DL}^{RB}$ is a total quantity of RBs in system bandwidth, and a parameter P is related to a system bandwidth size. For details, refer to the following description. $\lceil \cdot \rceil$ represents rounding up.

In an RB resource allocation mode 0, all RB resources constitute different resource block groups (RBG). Therefore, the allocation mode 0 uses the RBG as a basic unit for allocation. In this allocation mode, the field about resource configuration in the DCI uses one bitmap table to allocate RB resources. Each bit in this bitmap table represents one RBG. Each RBG consists of P RBs, and a value of P is related to downlink bandwidth, as shown in the following Table 8.

TABLE 8

| System Bandwidth | RBG Size (P) |
|---|---|
| ≤10 | 1 |
| 11-26 | 2 |
| 27-63 | 3 |
| 64-110 | 4 |

For example, a subcarrier spacing is 15 k, and downlink bandwidth is 20 MHz ($N_{DL}^{RB}$=100). Therefore, if RB resources are allocated based on the resource allocation mode 0, each RBG includes four RBs (P=4). If the bandwidth is 1.4 MHz ($N_{DL}^{RB}$=6), each RBG includes only one RB.

A quantity of RBGs that can be used by the resource allocation mode 0 is fixed for different bandwidth. If a variable $N_{RBG}$ is used to represent this value, $N_{RBG}=\lceil N_{DL}^{RB}/P \rceil$, where $\lceil \cdot \rceil$ represents rounding up of $N_{RBG}$. The DCI for each resource allocation mode 0 corresponds to a bitmap resource allocation table of a length of $N_{RBG}$ bits. This bitmap allocation table is encoded into a DCI code stream, and the UE can derive the RB resource used by the PDSCH from this allocation table.

For example, as shown in FIG. 10, when a downlink bandwidth is 3 MHz and a subcarrier spacing is 15 k, a quantity of RBs of the downlink bandwidth $N_{DL}^{RB}$ is 15 and P is 2. Therefore, $N_{RBG}=\lceil N_{DL}^{RB}/P \rceil=\lceil 15/2 \rceil=8$. However, it should be noted that if a system bandwidth is ($N_{DL}^{RB}$ mod P)!=0, a last RBG of the system bandwidth is not the same size as other RBGs. A quantity of RBs included in the last RBG is ($N_{DL}^{RB}$ mod P), and a quantity of RBs included in the other RBGs is P. For example, in a downlink bandwidth of 3 MHz, there are 7 (floor($N_{DL}^{RB}/P$=15/2)) RBGs except a last RBG, where floor( ) represents rounding down and each RBG has 2 RBs. In this case, these 7 RBGs totally occupy 7*2=14 RBs, which are fewer than 15 RBs of the entire bandwidth. Therefore, the quantity of RBs included in the last RBG=$N_{DL}^{RB}$-P*floor($N_{DL}^{RB}/P$)=15-2*(15/2)=1, and a last RB 14 constitutes an RBG 7 (where RBG numbers start from 0).

In addition, a bitmap table has high and low bit problems. The existing standard protocol clearly specifies that $RBG_0$ corresponds to a high bit of this bitmap, namely, an MSB while $RBG_{N_{RBG}-1}$ corresponds to a low bit of this bitmap, namely, an LSB. If the UE is decoded to a bit of 1 bit, it indicates that a corresponding RBG is allocated to this UE. For example, when a bandwidth is 3 M and a quantity of bits N_RBG occupied by the bitmap table=ceil(15/2)=8, where ceil represents rounding up, and bitmap bitstream=binary Bin(00001011), it indicates that RBG resource groups used by the UE are respectively an RBG 4, an RBG 6, and an RBG 7, so that used RB-IDs are respectively an RB 8, an RB 9 and an RB 12 to an RB 14. Therefore, the allocation mode 0 may be used to allocate discrete RB resources and a larger bandwidth indicates a coarser allocated RB granularity P.

For the method for indicating the scheduled bandwidth, the method for indicating the preoccupied bandwidth, or the method for indicating the reserved bandwidth mentioned in the embodiments of the present invention, refer to any one of the three methods in the existing standard of the LTE system. Details are not described herein.

Figure 11:
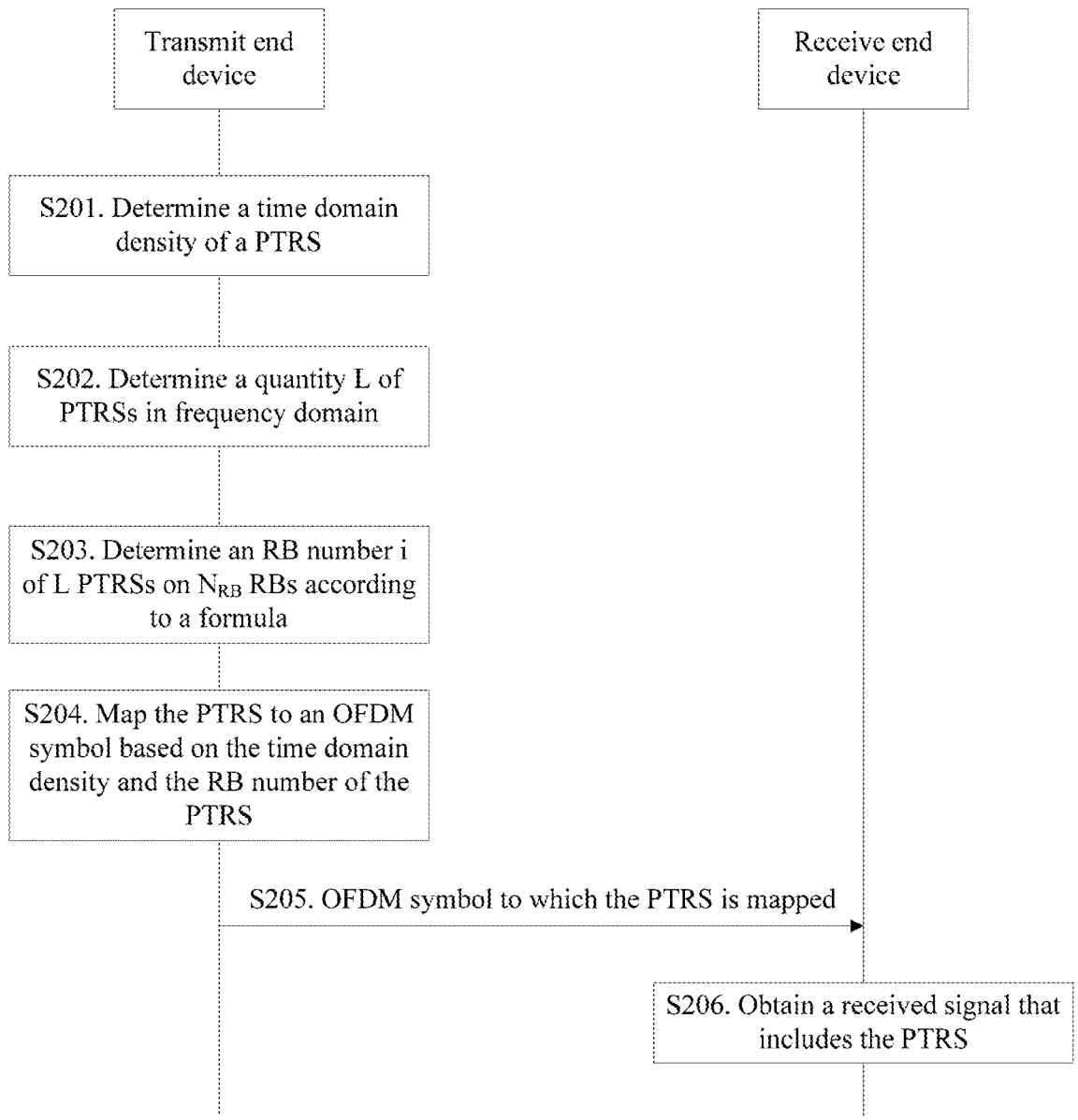
FIG. 11 is a schematic diagram of an interaction procedure in another communication method according to an embodiment of the present invention.

FIG. 11 is a schematic diagram of an interaction procedure in another communication method according to an embodiment of the present invention. The method may include the following steps:

S201. A transmit end device determines a time domain density of a PTRS.

S202. The transmit end device determines a quantity L of PTRSs mapped in frequency domain.

S203. The transmit end device determines a frequency domain RB number i of L PTRSs on $N_{RB}$ resource blocks RBs according to the following formula:

$$i = l \left\lfloor \frac{N_{RB}}{L} \right\rfloor + k_1, l = 0, 1, \ldots, L-1; \quad \text{Formula (2)}$$

$$k_1 = 0, 1, \ldots, N_{RB} - L * \left\lfloor \frac{N_{RB}}{L} \right\rfloor$$

$k_1$ is an offset, and $k_1$ is an integer.

S204. The transmit end device maps the PTRS to an OFDM symbol based on the time domain density and the frequency domain RB number (or index) of the PTRS.

S205. The transmit end device sends a signal that includes the OFDM symbol to which the PTRS is mapped.

S206. The receive end device receives the signal that includes the OFDM symbol to which the PTRS is mapped, and obtains the PTRS.

For the PTRS configuration in time domain, refer to the description in the foregoing embodiments. Details are not described herein again.

In this embodiment, the correspondence between the quantity of PTRSs in frequency domain and the scheduled bandwidth shown in Table 7 can be used. The frequency domain density can be represented as $$\left\lfloor \frac{L}{N_{RB}} \right\rfloor.$$

and a finer or coarser granularity may be used for interval division of the scheduled bandwidth. For example, rows of the correspondence table shown in Table 7 may be increased or decreased. Two cases are as follows: (a) The rows of the table may be increased or decreased; (b) A value on the left is made to be equal to a value on the right, to invalid a corresponding row.

It should be understood that, the table is merely an expression form of the correspondence list, and the correspondence list can also be expressed by using a formula, for example, Formula (3). A person skilled in the art may understand that, the correspondence list may alternatively be expressed in another form. This is not limited in this application.

$$L = \begin{cases} 0 & 0 \le N_{RB} < N_{RB1} \\ L_1 & N_{RB1} \le N_{RB} < N_{RB2} \\ L_2 & N_{RB2} \le N_{RB} < N_{RB3} \\ L_3 & N_{RB3} \le N_{RB} < N_{RB4} \\ L_4 & N_{RB4} \le N_{RB} \end{cases} \quad \text{Formula (3)}$$

Figure 12:
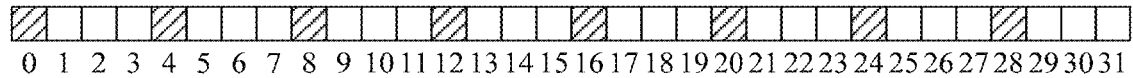
FIG. 12 is a schematic diagram of an RB to which a PTRS is mapped.
Figure 12:
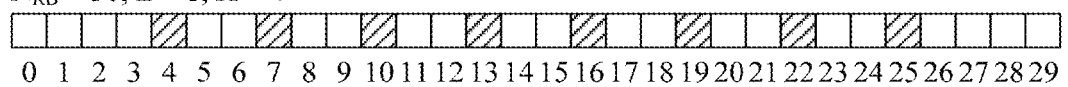
Figure 12:
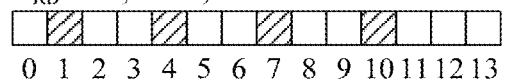

However, this embodiment uses Formula (2) to determine an RB number of the PTRS. For example, when $N_{RB}$=32, L=8, and $k_1$=0, or $N_{RB}$=30, L=8, and $k_1$=4, or $N_{RB}$=14, L=4, and $k_1$=1, Formula (2) is used to calculate the RB number, and the schematic diagrams of the RBs to which the PTRSs are mapped are shown in FIG. 12. It can be learned from the comparison of FIG. 10 and FIG. 1, the mapping of the PTRS in FIG. 12 is more uniform than the mapping of the PTRS in FIG. 1. In FIG. 12, quantities of RBs in intervals between any two RBs to which PTRSs are mapped in frequency domain are the same. It should be understood that the frequency domain density in the figure is merely an example. This is not limited in the present invention.

The RB number may be a serial number obtained after numbers of scheduled VRBs are sorted, or the RB number is a serial number obtained after numbers of the scheduled PRBs are sorted.

The transmit end device maps the PTRS to an OFDM symbol based on the time domain density and the RB number of the PTRS.

For details of S204 and S205, refer to the relative descriptions of the foregoing S104 and S105. Details are not described herein again.

The foregoing describes, by using an RB as an example granularity unit, the mapping of PTRS. It may be understood that the PTRS may alternatively be mapped by using another granularity unit with reference to the method of mapping the PTRS by using an RB granularity.

In an implementation, S202 may be implemented in the following manner.

A frequency domain resource element RE number $Index_{RE}$ of L PTRSs on $N_{RB}$ resource blocks can be determined according to the following formula:

$$Index_{RE} = l * \left\lfloor \frac{N_{RB} * 12}{L * I_{DMRS}} \right\rfloor * I_{DMRS} + k_2 * I_{DMRS}, \quad \text{Formula (4)}$$

$l = 0, 1, \ldots, L-1$ $I_{DMRS}$ is a frequency domain spacing of a DMRS. $k_2$ is an offset of the RE, and $$k_2 = 0, 1, \ldots, \frac{N_{RB} * 12}{I_{DMRS}} - L * \left\lfloor \frac{N_{RB} * 12}{L * I_{DMRS}} \right\rfloor.$$

When a PTRS is mapped, the PTRS is usually located on the same subcarrier with a DMRS. To be specific, a mapping location of a PTRS should be related to a DMRS location of a DMRS port associated with the PTRS. One PTRS occupies only one resource element. Therefore, when the PTRS is mapped at a resource element level, the RE number of the PTRS is determined by using Formula (4), and this can ensure that the mapping location of the PTRS is related to the DMRS location. The PTRS mapping in frequency domain is performed at the resource element level, so that the PTRS configuration can be more accurate.

In another implementation, step S202 may also be implemented in the following manner.

A frequency domain resource element RE number $Index_{RE}$ of L PTRSs on $N_{RB}$ resource blocks can be determined according to the following formula:

$$Index_{RE} = l * \left\lfloor \frac{N_{RB} * 12}{L} \right\rfloor + k_3, l = 0, 1, \ldots, L-1 \quad \text{Formula (5)}$$

$k_3$ is an offset of the RE, and $$k_3 = 0, 1, \ldots, N_{RB} * 12 - L * \left\lfloor \frac{N_{RB} * 12}{L} \right\rfloor.$$

One resource block includes 12 resource elements and one PTRS occupies only one resource element. Therefore, when the PTRS mapping in frequency domain is performed at a resource element level, the PTRS configuration can be more accurate. The PTRS is mapped at the RE level, that is, based on Formula (2), $N_{RB}$ is multiplied by 12. In other words, a basic unit is changed to an RE. Likewise, a value of $k_3$ is also at an RE level.

According to the communication method provided in the embodiments of the present invention, the uniform distribution of PTRSs can be achieved. Therefore, it becomes relatively easy to avoid a mapping location collision between the PTRS and another reference signal by setting an offset, and an interference randomization operation between terminal devices becomes simple.

Division of function modules may be performed on the transmit end device or the receive end device based on the foregoing method examples in the embodiments of this application. For example, the function modules may be divided based on corresponding functions, or two or more functions may be integrated into a processing module. The integrated module may be implemented in a form of hardware, or may be implemented in a form of a software function module. It should be noted that, the division of modules in the embodiment of this application is an example, and is merely a logical function division. In actual implementation, another division manner may be used. The following uses dividing function modules based on corresponding functions as an example for description.

An embodiment of this application further provides a communications apparatus. The communications apparatus may be a terminal device, or may be a chip that can be used for a terminal device. The communications apparatus may be configured to perform the steps performed by the terminal device in FIG. 3A, FIG. 3B, and FIG. 11.

Figure 13:
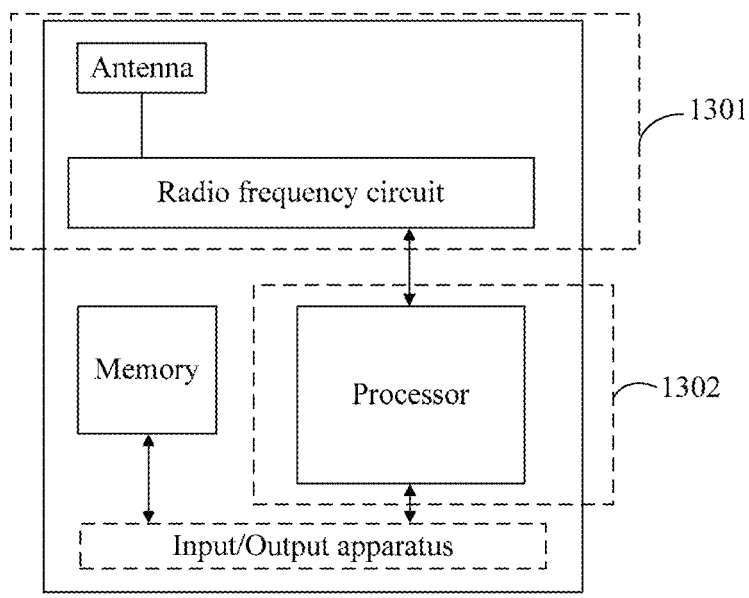
FIG. 13 is a schematic block diagram of a terminal device according to an embodiment of the present invention.

When the communications apparatus is a terminal device, FIG. 13 shows a schematic structural diagram of a simplified terminal device. For ease of understanding and illustration, that the terminal device is a mobile phone is used as an example in FIG. 13. As shown in FIG. 13, the terminal device includes a processor, a memory, a radio frequency circuit, an antenna, and an input/output apparatus. The processor is mainly configured to process a communications protocol and communication data, control the terminal device, execute a software program, process data of the software program, and the like. The memory is mainly configured to store a software program and data. The radio frequency circuit is mainly configured to perform conversion between a baseband signal and a radio frequency signal, and process the radio frequency signal. The antenna is mainly configured to receive and transmit a radio frequency signal in an electromagnetic wave form. The input/output apparatus, for example, a touchscreen, a display screen, or a keyboard, is mainly configured to receive data entered by a user, and output data to the user. It should be noted that some types of terminal devices may not have an input/output apparatus.

When data needs to be sent, the processor outputs a baseband signal to the radio frequency circuit after performing baseband processing on the to-be-sent data. After performing radio frequency processing on the baseband signal, the radio frequency circuit sends outwards a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into the data and processes the data. For ease of description, only one memory and one processor are shown in FIG. 13. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna and a radio frequency circuit that have a transceiver function may be considered as a transceiver unit of the terminal device, and a processor having a processing function is considered as a processing unit of the terminal device. As shown in FIG. 13, the terminal device includes a transceiver unit 1301 and a processing unit 1302. The transceiver unit may also be referred to as a transceiver, a transceiver, a transceiver apparatus, or the like. The processing unit may also be referred to as a processor, a processing board, a processing module, a processing apparatus, or the like. The processing unit may be a central processing unit (CPU for short), a network processor (NP for short), or a combination of a CPU and an NP. The processing unit may further include a hardware chip. The hardware chip may be an application-specific integrated circuit (ASIC for short), a programmable logic device (PLD for short), or a combination thereof. The PLD may be a complex programmable logic device (CPLD for short), a field-programmable gate array (FPGA for short), a generic array logic (GAL for short), or any combination thereof. Optionally, a device for implementing a receiving function in the transceiver unit 1301 may be considered as a receiving unit, and a device for implementing a sending function in the transceiver unit 1301 is considered as a sending unit, that is, the transceiver unit 1301 includes a receiving unit and a sending unit. The transceiver unit sometimes may also be referred to as a transceiver, a transceiver, a transceiver circuit, or the like. The receiving unit sometimes may also be referred to as a receiver, a receiver, a receiver circuit, or the like. A sending unit may also be referred to as a transmitter, a transmitter, a transmitter circuit, or the like.

For example, in an implementation, the processing unit 1301 is configured to perform step 306 in FIG. 3A, and/or another step in this application. The transceiver unit 1302 performs the receiving operation on a terminal side in step 305 in FIG. 3A, and/or another step in this application.

For example, in another implementation, the processing unit 1301 is configured to perform steps 301 to 304 in FIG. 3A, and/or another step in this application. The transceiver unit 1302 performs the sending operation on a terminal side in step 304 in FIG. 3A, and/or another step in this application.

For example, in another implementation, the processing unit 1301 is configured to perform step 105 in FIG. 3B, and/or another step in this application. The transceiver unit 1302 performs the receiving operation on a terminal side in step 105 in FIG. 3B, and/or another step in this application.

For example, in another implementation, the processing unit 1301 is configured to perform steps 101 to 104 in FIG. 3B, and/or another step in this application. The transceiver unit 1302 performs the sending operation on a terminal side in step 104 in FIG. 3B, and/or another step in this application.

For example, in another implementation, the processing unit 1301 is configured to perform step 206 in FIG. 11, and/or another step in this application. The transceiver unit 1302 performs the receiving operation on a terminal side in step 206 in FIG. 11, and/or another step in this application.

For example, in another implementation, the processing unit 1301 is configured to perform steps 201 to 205 in FIG. 11, and/or another step in this application. The transceiver unit 1302 performs the sending operation on a terminal side in step 205 in FIG. 11, and/or another step in this application.

Optionally, the terminal device further includes a storage unit configured to store a correspondence list, where the list includes at least one RB index interval and at least one frequency domain density of a PTRS, and the RB index interval and the frequency domain density of the PTRS are in a one-to-one correspondence; or the list includes at least one RB quantity interval and at least one frequency domain density of a PTRS, and the RB quantity interval and the frequency domain density of the PTRS are in a one-to-one correspondence; or the list includes at least one RB index interval, at least one frequency domain density of a PTRS, and at least one frequency domain offset, and the RB index interval, the frequency domain density of the PTRS, and the frequency domain offset are in a one-to-one correspondence; or the list includes at least one RB quantity interval, at least one frequency domain density of a PTRS, and at least one frequency domain offset, and the RB quantity interval, the frequency domain density of the PTRS, and the frequency domain offset are in a one-to-one correspondence.

When the communications apparatus is a chip, the chip includes a transceiver unit and a processing unit. The transceiver unit may be an input/output circuit or a communications interface. The processing unit is an integrated processor, a microprocessor, or an integrated circuit on the chip.

An embodiment of this application further provides a communications apparatus. The communications apparatus may be a network device, or may be a chip. The communications apparatus may be configured to perform the steps performed by the network device in FIG. 3A, FIG. 3B, and FIG. 11.

Figure 14:
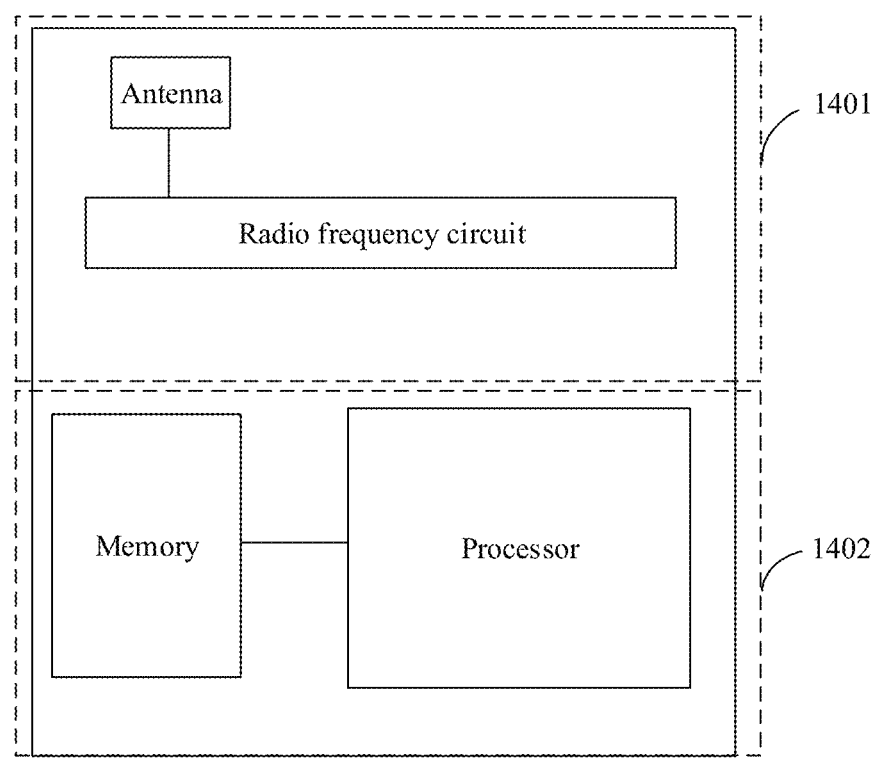
FIG. 14 is a schematic block diagram of a network device according to an embodiment of the present invention.

When the communications apparatus is a network device, specifically, for example, a base station, FIG. 14 shows a schematic structural diagram of a simplified base station. The base station includes a part 1401 and a part 1402. The part 1401 is mainly configured to send and receive a radio frequency signal, and perform conversion between the radio frequency signal and a baseband signal. The part 1402 is mainly configured to perform baseband processing, control the base station, and the like. The part 1401 may be usually referred to as a transceiver unit, a transceiver, a transceiver circuit, a transceiver, or the like. The part 1402 is usually a control center of a base station, may be usually referred to as a processing unit, and is configured to control the base station to perform the steps performed by a receive end device in the foregoing figures. For details, refer to the foregoing related descriptions.

A transceiver unit of the part 1401 may also be referred to as a transceiver, a transceiver, or the like. The transceiver unit may include an antenna and a radio frequency unit, where the radio frequency unit is mainly configured to perform radio frequency processing. Optionally, a device for implementing a receiving function in the part 1401 may be considered as a receiving unit, and a device for implementing a sending function is considered as a sending unit, that is, the part 1401 includes a receiving unit and a sending unit. The receiving unit may also be referred to as a receiver, a receiver, a receiver circuit, or the like. The sending unit may be referred to as a transmitter, a transmitter, a transmitter circuit, or the like.

The part 1402 may include one or more boards. Each board may include one or more processors and one or more memories. The processor is configured to read and execute a program in the memory to implement a baseband processing function and control the base station. If there are a plurality of boards, the boards may be interconnected to increase a processing capability. In an optional implementation, the plurality of boards may share one or more processors, the plurality of boards share one or more memories, or the plurality of boards share one or more processors at the same time.

For example, in an implementation, the processing unit 1402 is configured to perform the operations of steps 301 to 304 in FIG. 3A. The transceiver unit is configured to perform the sending operation on a network device side in step 304 in FIG. 3A.

In another implementation, the processing unit 1402 is configured to perform the operation of step 306 in FIG. 3A. The transceiver unit is configured to perform the receiving operation on a network device side in step 305 in FIG. 3A.

In another implementation, the processing unit 1402 is configured to perform the operations of steps 101 to 104 in FIG. 3B. The transceiver unit is configured to perform the sending operation on a network device side in step 104 in FIG. 3B.

In another implementation, the processing unit 1402 is configured to perform the operation of step 105 in FIG. 3B. The transceiver unit is configured to perform the receiving operation on a network device side in step 105 in FIG. 3B.

In another implementation, the processing unit 1402 is configured to perform the operations of steps 201 to 104 in FIG. 11. The transceiver unit is configured to perform the sending operation on a network device side in step 205 in FIG. 11.

In another implementation, the processing unit 1402 is configured to perform the operation of step 206 in FIG. 11. The transceiver unit is configured to perform the receiving operation on a network device side in step 206 in FIG. 11.

Optionally, the network device also includes a storage unit configured to store a correspondence list, where the list includes at least one RB index interval and at least one frequency domain density of a PTRS, and the RB index interval and the frequency domain density of the PTRS are in a one-to-one correspondence; or the list includes at least one RB quantity interval and at least one frequency domain density of a PTRS, and the RB quantity interval and the frequency domain density of the PTRS are in a one-to-one correspondence; or the list includes at least one RB index interval, at least one frequency domain density of a PTRS, and at least one frequency domain offset, and the RB index interval, the frequency domain density of the PTRS, and the frequency domain offset are in a one-to-one correspondence; or the list includes at least one RB quantity interval, at least one frequency domain density of a PTRS, and at least one frequency domain offset, and the RB quantity interval, the frequency domain density of the PTRS, and the frequency domain offset are in a one-to-one correspondence.

The communications apparatus may be a chip, and the chip includes a transceiver unit and a processing unit. The transceiver unit may be an input/output circuit or a communications interface of the chip. The processing unit is an integrated processor, a microprocessor, or an integrated circuit on the chip. The chip may be applied to the foregoing transmit end device or the receive end device, and supports the transmit end apparatus or the receive end device in performing the foregoing methods.

For explanation of related content and beneficial effects of any one of the foregoing provided communications apparatuses, refer to the corresponding method embodiments provided in the foregoing description. Details are not described herein again.

Some or all of the foregoing embodiments may be implemented by software, hardware, firmware, or any combination thereof. When a software program is used to implement the embodiments, some or all of the embodiments may be implemented in a form of a computer program product. The computer program product includes one or more computer instructions. When the computer program instructions are loaded and executed on a computer, some or all of the procedures or functions according to the embodiments of this application are generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described herein with reference to the embodiments, in a process of implementing this application that claims protection, a person skilled in the art may understand and implement other variations of the disclosed embodiments.

An embodiment of the present invention further provides a chip. The chip includes a communications interface and a processor. The processor is configured to control the communications interface to receive or send a signal, and process a signal received by the communications interface or generate a signal to be sent by the communications interface. The processor is configured to perform processing functions of a transmit end device or a receive end device provided in the foregoing method embodiments, for example, determining a time domain density or a frequency domain density. For details, refer to descriptions in the foregoing method embodiments.

Optionally, the chip further includes a storage module and the storage module stores an instruction. The processing module performs a related operation by reading the instruction stored in the storage module and controls the communications interface to perform a related transceiver operation.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely a logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each unit may exist alone physically, or two or more units are integrated into one unit.

Some or all of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, some or all of the procedures or functions according to the embodiments of the present invention are generated. The computer may be a general-purpose computer, a special-purpose computer, a computer network, or another programmable apparatus. The computer instruction may be stored in a computer readable storage medium, or may be transmitted by using the computer readable storage medium. The computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that some or all of the procedures of the methods in the embodiments may be implemented by a computer program instructing related hardware. The program may be stored in a computer readable storage medium. When the program is executed, the procedures of the foregoing method embodiments are performed. The foregoing storage medium includes any medium that can store program code, such as a read-only memory (ROM), a random access memory (RAM), a magnetic disk, or an optical disc.

What is claimed is:

1. An information transmission method, applied to an information transmission apparatus comprising a processor and a transmitter, the method comprising:
   determining a time domain density of a phase tracking reference signal (PTRS);
   determining a frequency domain density of the PTRS based on an available bandwidth,
     wherein the available bandwidth is associated with the frequency domain density,
     wherein the frequency domain density of the PTRS is 0, and
     wherein the available bandwidth is lower than a preset threshold;

mapping the PTRS to one or more orthogonal frequency division multiplexing (OFDM) symbols based on the time domain density and the frequency domain density; and sending a signal that comprises the OFDM symbol to which the PTRS is mapped.

2. The method according to claim 1, further comprising: sending one or more of the following to a receive end device: information indicating a scheduled bandwidth, information indicating a preoccupied bandwidth, and information indicating a reserved bandwidth.

3. The method according to claim 1, wherein mapping the PTRS to the one or more OFDM symbols based on the time domain density and the frequency domain density comprises:

mapping the PTRS to the one or more OFDM symbols based on the time domain density, the frequency domain density, and a frequency domain offset.

4. An information transmission method, applied to an information transmission apparatus comprising a processor and a receiver, the method comprising:
receiving one or more orthogonal frequency division multiplexing (OFDM) symbols; and
determining a phase tracking reference (PTRS) mapped to the one or more OFDM symbols, including:
determining a time domain density of the PTRS; and
determining a frequency domain density of the PTRS based on an available bandwidth,
wherein the available bandwidth is associated with the frequency domain density,
wherein the frequency domain density of the PTRS is 0, and
wherein the available bandwidth is lower than a preset threshold.

5. The method according to claim 4, further comprising: receiving one or more of the following from a transmit end device: information indicating scheduled bandwidth, information indicating preoccupied bandwidth, and information indicating reserved bandwidth.

6. The method according to claim 4, wherein determining the PTRS further comprises determining a frequency domain offset of the PTRS.

7. The method according to claim 2, wherein the available bandwidth is one of the following (a), (b) and (c):
(a) a part other than the preoccupied bandwidth in the scheduled bandwidth,
(b) a part other than the reserved bandwidth in the scheduled bandwidth, and
(c) a part other than the preoccupied bandwidth and the reserved bandwidth in the scheduled bandwidth.

8. The method according to claim 2, wherein the preoccupied bandwidth is bandwidth occupied by one or more of the following signals: a synchronization signal block (SS block), a physical downlink control channel (PDCCH), an enhanced physical downlink control channel (EPDCCH), a physical broadcast channel (PBCH), a primary synchronization signal (PSS), a secondary synchronization signal (SSS), a demodulation reference signal (DMRS), a channel state information-reference signal (CSI-RS), a physical uplink control channel (PUCCH), or a sounding reference signal (SRS).

9. A non-transitory computer-readable storage medium, comprising a processor-executable instruction, wherein when the instruction is run on a processor of a computer, the computer performs the method according to claim 1.

10. An information transmission apparatus comprising: a processor configured to:
determine a time domain density of a phase tracking reference signal (PTRS);
determine a frequency domain density of the PTRS based on an available bandwidth,
wherein the available bandwidth is associated with the frequency domain density,
wherein the frequency domain density of the PTRS is 0, and
wherein the available bandwidth is lower than a preset threshold;
map the PTRS to one or more orthogonal frequency division multiplexing (OFDM) symbols based on the time domain density and the frequency domain density; and
a transmitter configured to cooperate with the processor to send a signal that comprises the OFDM symbol to which the PTRS is mapped.

11. The apparatus according to claim 10, wherein the transmitter is further configured to send one or more of the following: information indicating a scheduled bandwidth, information indicating a preoccupied bandwidth, and information indicating a reserved bandwidth.

12. The apparatus according to claim 10, wherein the processor is further configured to map the PTRS to one or more OFDM symbols based on the time domain density, the frequency domain density, and a frequency domain offset.

13. An information transmission apparatus comprising:
a receiver configured to cooperate with a processor to receive one or more orthogonal frequency division multiplexing (OFDM) symbols; and
the processor configured to
determine a phase tracking reference signal (PTRS) mapped to the one or more OFDM symbols, including:
determining a time domain density of the PTRS; and
determining a frequency domain density of the PTRS based on an available bandwidth,
wherein the available bandwidth is associated with the frequency domain density,
wherein the frequency domain density of the PTRS is 0, and
wherein the available bandwidth is lower than a preset threshold.

14. The apparatus according to claim 13, wherein the receiver is further configured to cooperate with the processor to receive one or more of the following from a transmit end device: information indicating a scheduled bandwidth, information indicating a preoccupied bandwidth, and information indicating a reserved bandwidth.

15. The apparatus according to claim 13, wherein the processor is further configured to determine a frequency domain offset of the PTRS.

16. The method according to claim 1, wherein the available bandwidth is bandwidth scheduled for transmitting a data service and a control signal of a user and does not include bandwidth occupied by another signal.

17. The method according to claim 4, wherein the available bandwidth is bandwidth scheduled for transmitting a data service and a control signal of a user and does not include bandwidth occupied by another signal.

18. The apparatus according to claim 10, wherein the available bandwidth is bandwidth scheduled for transmitting a data service and a control signal of a user and does not include bandwidth occupied by another signal.

* * * * *

UNITED STATES PATENT AND TRADEMARK OFFICE
CERTIFICATE OF CORRECTION

PATENT NO. : 11,343,045 B2
APPLICATION NO. : 16/788237
DATED : May 24, 2022
INVENTOR(S) : Xu et al.

It is certified that error appears in the above-identified patent and that said Letters Patent is hereby corrected as shown below:

In the Claims

Claim 4: Column 31, Line 25: "determining a phase tracking reference (PTRS) mapped to" should read -- determining a phase tracking reference signal (PTRS) mapped to --.

Signed and Sealed this
Eleventh Day of October, 2022

Katherine Kelly Vidal
*Director of the United States Patent and Trademark Office*